US012805591B2

(12) United States Patent
Harris

(10) Patent No.: US 12,805,591 B2
(45) Date of Patent: Nov. 24, 2026

(54) ILLUMINATING HELMET

(71) Applicant: Mareo Alexander Harris, Atlanta, GA (US)

(72) Inventor: Mareo Alexander Harris, Atlanta, GA (US)

( * ) Notice: Subject to any disclaimer, the term of this patent is extended or adjusted under 35 U.S.C. 154(b) by 0 days.

(21) Appl. No.: 16/804,078

(22) Filed: Feb. 28, 2020

(65) Prior Publication Data

US 2020/0205501 A1 Jul. 2, 2020

Related U.S. Application Data

(63) Continuation of application No. 15/690,690, filed on Aug. 30, 2017, now Pat. No. 10,575,580.

(60) Provisional application No. 62/381,082, filed on Aug. 30, 2016.

(51) Int. Cl.

| | |
|---|---|
| ***A42B 3/04*** | (2006.01) |
| ***A63B 71/10*** | (2006.01) |
| ***F21V 3/06*** | (2018.01) |
| ***F21Y 107/20*** | (2016.01) |
| ***F21Y 115/10*** | (2016.01) |
| ***F21Y 115/15*** | (2016.01) |
| ***F21Y 115/20*** | (2016.01) |

(52) U.S. Cl.

CPC .............. *A42B 3/044* (2013.01); *A63B 71/10* (2013.01); *F21V 3/062* (2018.02); *F21Y 2107/20* (2016.08); *F21Y 2115/10* (2016.08); *F21Y 2115/15* (2016.08); *F21Y 2115/20* (2016.08)

(58) Field of Classification Search

CPC ....... F21V 3/0436; F21V 3/062; A42B 3/044; A63B 71/10

See application file for complete search history.

(56) References Cited

U.S. PATENT DOCUMENTS

| | | | | |
|---|---|---|---|---|
| 4,891,736 | A * | 1/1990 | Gouda ................. | A42B 3/0453 362/105 |
| 5,357,409 | A | 10/1994 | Glatt | |
| 5,615,940 | A * | 4/1997 | Barry ......................... | B62J 6/00 362/473 |
| 5,743,621 | A | 4/1998 | Mantha et al. | |
| 5,758,946 | A | 6/1998 | Chen | |
| 6,007,213 | A | 12/1999 | Baumgartner | |
| 7,075,250 | B2 | 7/2006 | Colwell | |
| 7,121,676 | B1 | 10/2006 | Kutnyak | |
| 7,147,338 | B2 | 12/2006 | Gregg | |
| 7,264,368 | B2 | 9/2007 | Sherring | |

(Continued)

FOREIGN PATENT DOCUMENTS

| | | |
|---|---|---|
| AU | 2015100434 A4 | 5/2015 |
| CN | 204393475 U | 6/2015 |

(Continued)

OTHER PUBLICATIONS

Gao et al., "Improvement of Oled's performance with graphene doped in NPB as hole transport layer." J Mater Sci, Feb. 13, 2016.

(Continued)

*Primary Examiner* — Laura A Gudorf

(74) *Attorney, Agent, or Firm* — CANTOR COLBURN LLP

(57) ABSTRACT

A technique relates to a head apparatus for a user. A structure has an opening. A light source includes one or more graphene elements.

13 Claims, 20 Drawing Sheets

(56) References Cited

U.S. PATENT DOCUMENTS 7,509,835 B2 3/2009 Beck
7,814,578 B2 10/2010 Kosel et al.
7,845,816 B2 12/2010 Lombard et al.
7,901,104 B2 3/2011 McLean et al.
7,950,074 B2 5/2011 Loizzo
8,469,569 B1 6/2013 Tunnicliffe et al.
8,550,650 B1 10/2013 Mcginty
9,210,963 B1 * 12/2015 Ellis .................... H04R 1/028
9,239,417 B2 1/2016 Wolk et al.
9,247,780 B2 2/2016 Iuliano et al.
9,474,137 B1 * 10/2016 Wein .................... G06K 19/04
2002/0157173 A1 10/2002 Murasko et al.
2005/0270280 A1 * 12/2005 Riback .................... H04N 21/41 348/E5.002
2008/0266838 A1 10/2008 Lin
2009/0288317 A1 * 11/2009 Forbes .................... A43B 3/00 40/544
2011/0289658 A1 12/2011 Knoepfli et al.
2012/0032816 A1 * 2/2012 Cho .................... G06Q 30/02 340/815.4
2012/0243210 A1 9/2012 Brown
2012/0317705 A1 12/2012 Lindsay
2013/0048943 A1 * 2/2013 Lee .................... H10K 50/816 257/E51.026
2013/0065034 A1 3/2013 Muramatsu
2013/0167290 A1 * 7/2013 Ben Ezra .................... A42B 3/046 473/570
2013/0174323 A1 7/2013 Mcfall
2014/0111977 A1 4/2014 Nyberg
2014/0221137 A1 * 8/2014 Krysiak .................... G09B 19/0038 473/570
2014/0362565 A1 * 12/2014 Yao .................... F21K 9/232 362/223
2015/0091437 A1 * 4/2015 Kim .................... G09F 13/22 315/71
2015/0173444 A1 * 6/2015 O'Dell .................... A42B 3/042 2/422
2015/0195890 A1 7/2015 Forgey
2015/0227164 A1 * 8/2015 Laycock .................... G06F 1/1652 345/82
2015/0250247 A1 9/2015 Beckers et al.
2015/0271367 A1 * 9/2015 Musec .................... A42B 3/20 348/376
2015/0327615 A1 11/2015 Gelb
2016/0136504 A1 * 5/2016 Cuttino .................... A63B 71/0605 473/415
2016/0203663 A1 * 7/2016 Proctor .................... G06F 3/16 340/5.61
2016/0209025 A1 * 7/2016 Matthews .................... F21V 17/104
2016/0214200 A1 * 7/2016 Beeson .................... A61F 9/064
2016/0253952 A1 * 9/2016 Cox .................... G09G 3/3208 345/184
2017/0091782 A1 3/2017 Nawrocki
2017/0256679 A1 * 9/2017 Fan .................... H10H 20/822
2018/0055131 A1 * 3/2018 Thompson .................... F21V 23/0407
2018/0133060 A1 * 5/2018 Patel .................... F21V 23/0464

FOREIGN PATENT DOCUMENTS

CN 204994709 U 1/2016
EP 1084635 A1 9/2000
WO 2012025463 A1 3/2012

OTHER PUBLICATIONS

International Preliminary Report on Patentability, Mailed Mar. 14, 2019.
International Search Report and Written Opinion, Issued Nov. 3, 2017.
Kim et al. "Bright Visible Light Emission From Graphene." Nature NanoTechnology, Letters, Jun. 15, 2015.

* cited by examiner

FIG. 13

| | STANDARD COMPONENTS | LOCATION |
|---|---|---|
| LINERS | FlexLiner - Back/Side/Neck - Black | A |
| | Occipital Cradle Liner - White Nameplate w/Logo | B |
| | Back/Side Liner | C |
| | Front Pad | D |
| | Front Pocket - Black w/White Bumper | E |
| | Crown Liner | F |
| | Faceframe Assembly - Right - White | G |
| | Faceframe Assembly - Left - White | G |
| HARDWARE | Thumb Screw | J |
| | Strap-Loc - Right - Black | K |
| | Strap-Loc - Left - Black | K |
| | Strap-Loc Screw | *n/a* |
| | Liner Attachment Cap - Black | M |
| | Ratchet-Loc Housing | *n/a* |
| | Chin Strap Retainer Clip | O |

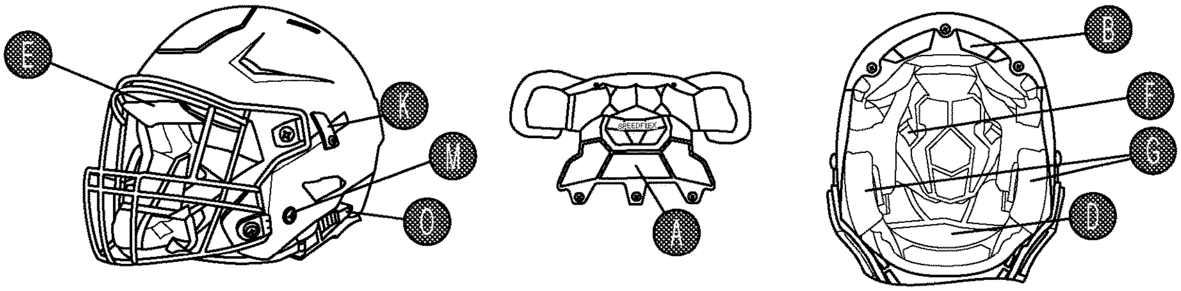

*Not pictured: C, H, I, J, L, N*

SPEEDFLEX *STANDARD BUILD COMPONENTS*

ILLUMINATING HELMET

DOMESTIC PRIORITY

This application is a continuation of U.S. Non-Provisional application Ser. No. 15/690,690, entitled "ILLUMINATING HELMET", filed Aug. 30, 2017, which claims priority to U.S. Provisional Application No. 62/381,082, entitled "ILLUMINATING HELMET" filed Aug. 30, 2016, the contents of which are incorporated by reference herein in their entireties.

BACKGROUND

The present invention relates to illuminating helmets, and more specifically, to illuminating helmets via a light source such as graphene, organic light emitting diodes (OLEDs), light emitting diodes (LEDs), and/or a light source that uses graphene.

There are many types of helmets or headgear utilized to protect the head. There are bike helmets, motorcycle helmets, football helmets, lacrosse helmets, baseball helmets, military helmets, firefighter, etc. For example, football helmets are to protect players from catastrophic brain injuries while playing football.

Exterior Protection

Most football helmets use a polycarbonate shell, which is a type of hard, durable plastic. This helps deflect the force of blows to the head to help prevent skull fractures and other serious head injuries. The plastic is light enough to keep the player from adding too much weight to his head/neck while still providing the necessary protection.

Interior Protection: Soft on the Inside

Inside the hard shell, football helmets offer a variety of softer protection around the head. The front of the helmet protects the forehead with a firm foam designed to deflect direct forward hits. The foam around the jaw area is a bit softer for comfort, while still providing firm support. The rest of the helmet provides several layers of foam, including a spongy layer that rests against the head to make the helmet more comfortable. Some helmets also offer inflatable air pockets to help the player custom fit the helmet to his head.

Face Masks

The face mask is the part of the helmet that directly covers the face. It is a major protection for the players and is usually made of metal covered either with rubber or plastic. Details of the face mask may vary according to each player and their needs. For some football positions such as linemen, the face mask may have several bars on protecting the face, and the bars run in both horizontally and vertically.

Visors

A more recent addition to the football helmet is the visor or eye shield, which is affixed to the face mask to protect players from glare or eye injuries, such as pokes.

Sensors

Helmet shock data loggers and shock detectors monitor impacts a player receives, such as the force and direction of the impact. If the force recorded by the sensors is over 100 Gs, it may signal a possible concussion.

SUMMARY

Embodiments are directed to a head apparatus for a user. Non-limiting examples of the head apparatus include a structure having an opening, and a light source comprising one or more graphene elements. The light source is positioned to the structure.

Embodiments are directed to a head apparatus for a user. Non-limiting examples of the head apparatus include a structure having an opening, and a light source comprising one or more graphene strips, graphene sheets, graphene stickers, graphene film, graphene spray OLEDs and/or LEDs. The light source (comprising one or more graphene strips, graphene sheets, graphene stickers, graphene film, graphene spray OLEDs and/or LEDs) is embedded in at least one or more portions of structure.

Embodiments are directed to method of forming a head apparatus. Non-limiting examples of the method include providing a structure having an opening, and configuring a light source to be in the structure. The light source comprises at least one of one or more graphene elements, one or more organic light emitting diodes (OLEDs), and/or one or more light emitting diodes (LEDs).

BRIEF DESCRIPTION OF THE DRAWINGS

FIG. 13 is an example of a football helmet showing various details which can be included in one or more embodiments.

DETAILED DESCRIPTION

Figure 1:
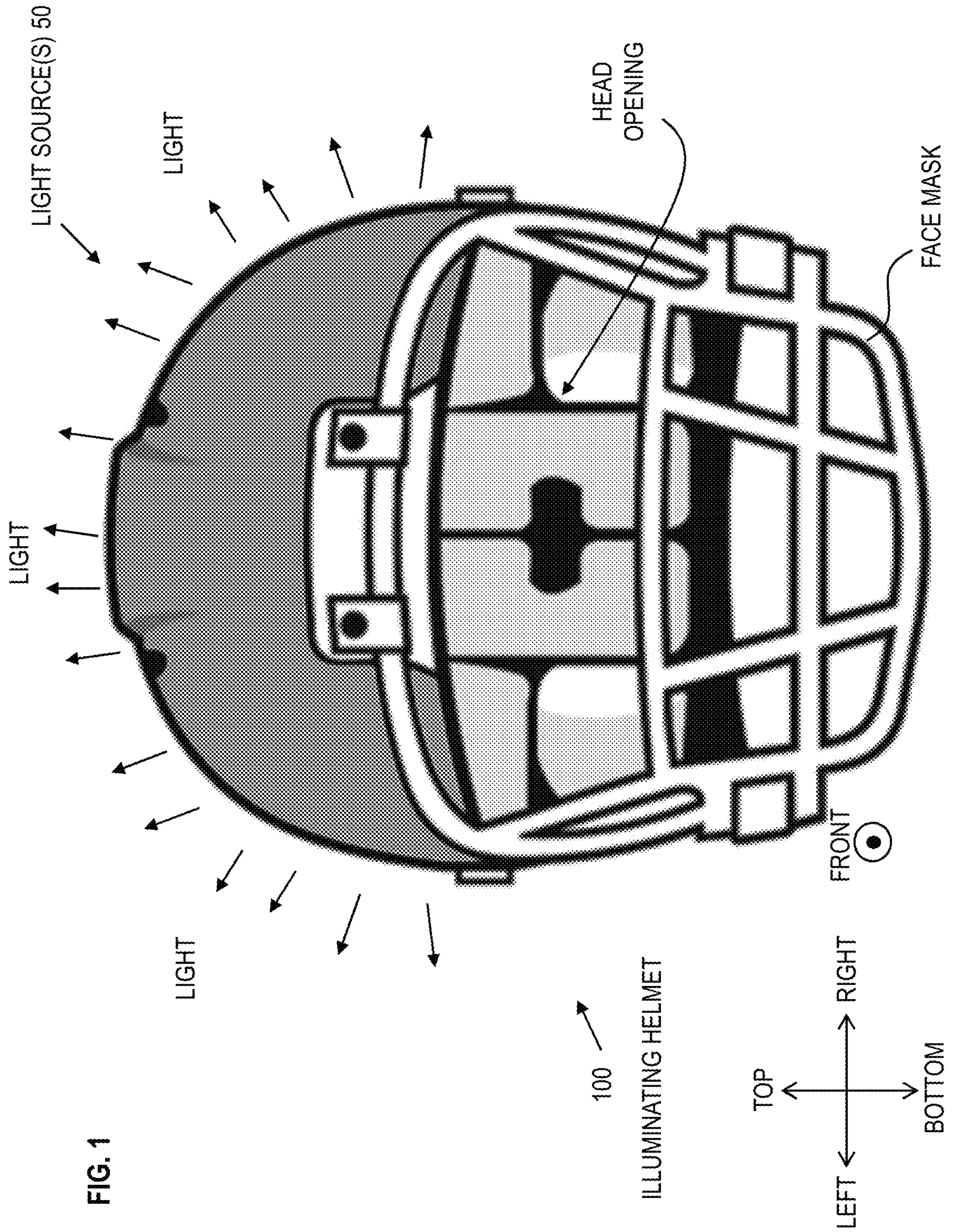
FIG. 1 depicts an example of an illuminating helmet according to one or more embodiments.

Various embodiments are described herein with reference to the related drawings. Alternative embodiments may be devised without departing from the scope of this document. It is noted that various connections and positional relationships (e.g., over, below, adjacent, etc.) are set forth between elements in the following description and in the drawings. These connections and/or positional relationships, unless specified otherwise, may be direct or indirect, and are not intended to be limiting in this respect. Accordingly, a coupling of entities may refer to either a direct or an indirect coupling, and a positional relationship between entities may be a direct or indirect positional relationship. As an example of an indirect positional relationship, references to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Now turning to the figures, FIG. 1 depicts an example of an illuminating helmet 100 according to one or more embodiments. The illuminating helmet 100 includes one or more light sources 50, which can be arranged/positioned in desired shapes. As one example of the light sources 50, the illuminating helmet 100 may be illuminated using graphene connected to a power source (for example, power source 805 discussed herein). There may be various locations at which the graphene is positioned to illuminate, i.e., visibly illuminate/produce light such that a spectator, coach, referee, parent, another team member, etc., can visually see the illumination of the light sources 50. There are many coverage options for the graphene as the light source 50, and embodiments are not meant to be limited to examples that are illustrated for explanation purposes. The illuminating helmet 100 may be designed to illuminate at any location including the entire helmet and/or substantially the entire helmet.

The illuminating helmet 100 has a front depicted by a dot (pointing outward toward the reader), a back in the opposite direction of the front, a left side, a right side, a top and a bottom, as understood by one skilled in the art. For explanation purposes, examples illustrate features of a football helmet such padding, face mask, etc., but it should be understood that the embodiments are not limited to football helmets and apply to other types of helmets, hats, headgear, etc. For explanation purposes, the helmet is discussed as having a hard outer shell, but it should be understood that one or more embodiments can apply to a softer outer shell.

Figure 2:
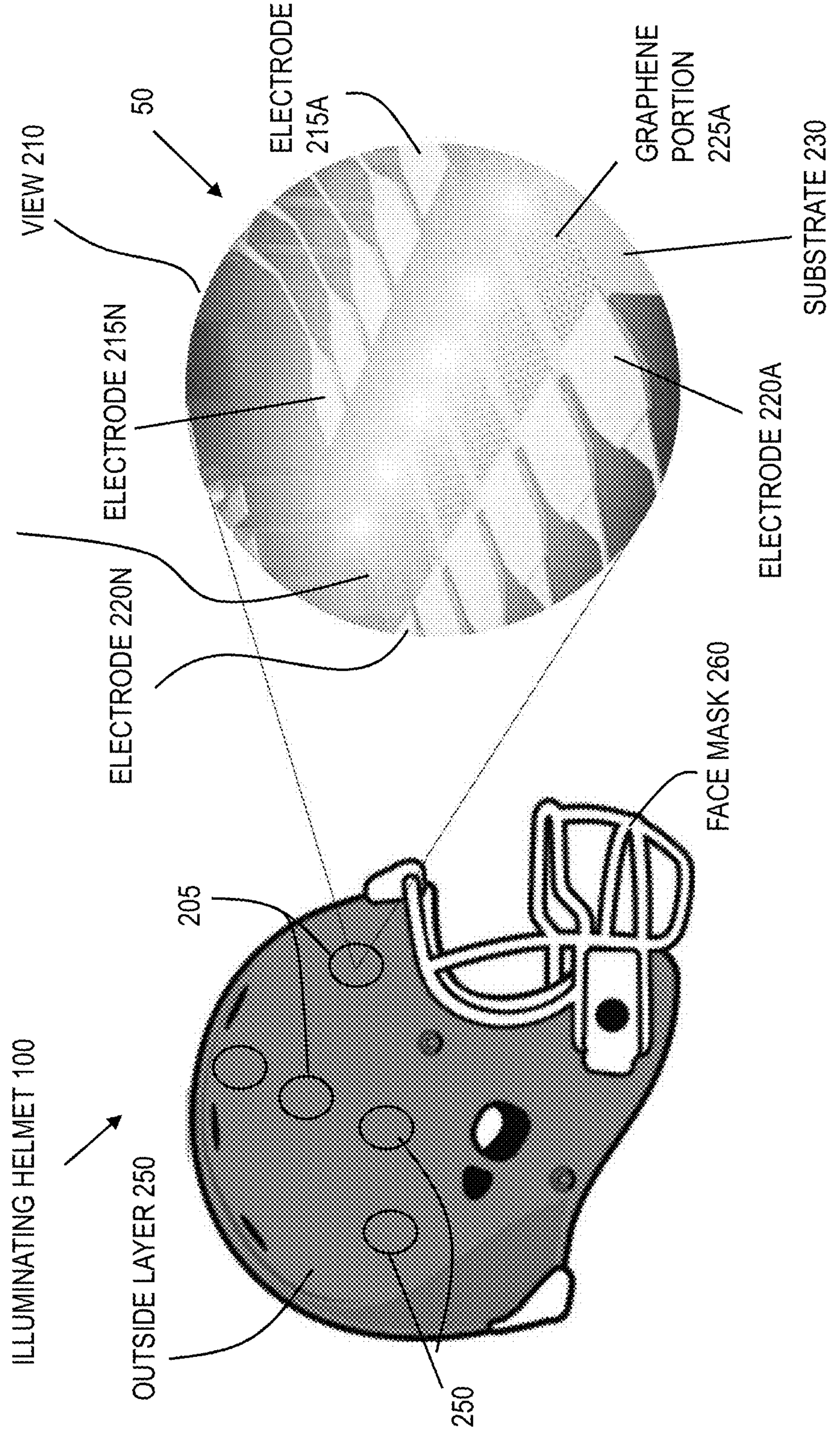
FIG. 2 depicts the illuminating helmet with an enlarged view according to one or more embodiments.

FIG. 2 depicts the illuminating helmet 100 with an enlarged view according to one or more embodiments. The illuminating helmet 100 includes the various conventional features of a typical helmet as understood by one skilled in the art. The illuminating helmet 100 includes a face mask 260 suitably attached to an outside layer 250 (which can be an outer shell).

As one implementation, location 205 illustrates an internal view of the illuminating helmet 100 as though the outside layer 250 is removed and/or as though the outside layer 250 is transparent or semitransparent. The enlarged internal view provides a peek The outside layer 250 provides exterior protection and may be a polycarbonate shell. An interval view 210 is illustrated as one example of implementing one or more graphene portions 225 as light sources 50 to illuminate the illuminating helmet 100.

Figure 3A:
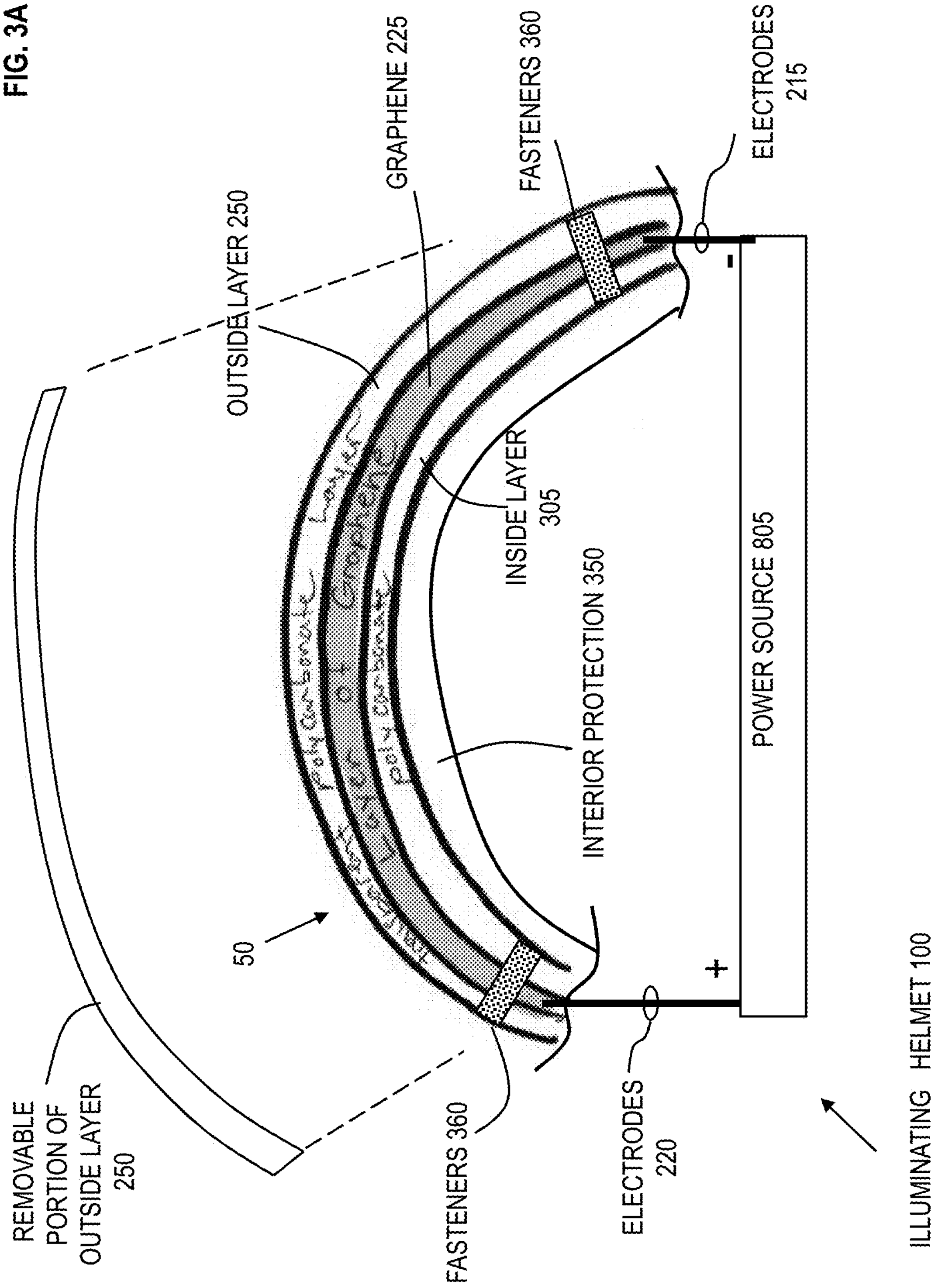
FIG. 3A depicts a portion of the illuminating helmet with further details according to one or more embodiments.

In one implementation, there can be many graphene portions 225 connected to a power supply. These graphene portions 225 can be strips of graphene. For example, one graphene portion 225A may be electrically connected to an electrode 215A at one end and electrically connected to another electrode 220A at the other end. Another graphene portion 225B may be electrically connected to an electrode 215B at one end and electrically connected to another electrode 220B at the other end, and so forth. There may be electrodes 215A-215N each respectively connected to its own one of the graphene portions 225A-225N, along with corresponding electrodes 220A-220N each connected to its own one of the graphene portions 225A-225N at the other end, where N represents the last number and N is not equal 0. Accordingly, there are multiple pairs of electrodes, such as electrode pair 215A and 220A, electrode pair 215B and 220B, through electrode pair 215N and 220N, where each electrode pair is connected to one of the graphene portions 225A-225N to supply power for illuminating the respective graphene portion 225. The one or more graphene portions 225A-225N may be suspended over a substrate 230 to be illuminated by supplying power (e.g., voltage and current) from a power source. The substrate 230 may be a nonconductive material. In one case, the substrate 230 can be un-doped silicon, an oxide, a nitride, plastic, rubber, etc. The substrate 230 can be an insulator. The substrate 230 can be a portion of the outside layer 250 that has been indented and/or cutaway to accommodate and/or fit under the light source 50, and a cover can be placed over the light source 50 (as depicted in FIG. 3A). For example, the location 205 can be representative of a portion of the outside layer 250 that has been physical removed, indented, and/or voided such that the light source 50 fits into the void, cavity, and/or indent made by the absence of the outside layer 205. There are many ways to embed the light source 50 into one or more portions of the illuminating helmet 100. Also, there can be numerous locations 205 have the light source 50.

Reference can be made to "Bright Visible Light Emission From Graphene" in Nature Nanotechnology 10, 676-681 (2015) doi:10.1038/nnano.2015.118, published online 15 Jun. 2015, by Young Duck Kim, et al., which is incorporated by reference herein. The publication illustrates how they attached small strips of graphene to metal electrodes, suspended the strips above the substrate, and passed a current through the filaments to cause them to heat up. This ultimately resulted in the strips of graphene illuminating. Furthermore, the ability of graphene to achieve such high temperatures without melting the substrate or the metal electrodes is due to another property: as it heats up, graphene becomes a much poorer conductor of heat. This means that the high temperatures stay confined to a small "hot spot" in the center. At the highest temperatures, the electron temperature is much higher than that of acoustic vibrational modes of the graphene lattice, so that less energy is needed to attain temperatures needed for visible light emission.

More regarding graphene is discussed below. In simple terms, graphene is a thin layer of pure carbon. It is a single, tightly packed layer of carbon atoms that are bonded together in a hexagonal honeycomb lattice. In more complex terms, graphene is an allotrope of carbon in the form of a two-dimensional, atomic-scale, honey-comb lattice in which one atom forms each vertex. Graphene is the basic structural element of other allotropes, including graphite, charcoal, carbon nanotubes, and fullerenes.

Graphene is an optoelectronic material that can be utilized in optoelectronic applications. In one example, for a material to be used in optoelectronics, it should be able to transmit more than 90% of light and also offer electrical conductive proper exceeding $1\cdot10^6$ Ohm-meters (Ωm) and therefore low electrical resistance. In one case, graphene is an almost completely transparent material and is able to optically transmit up to 97.7% of light. Graphene is also highly conductive and works very well in various optoelectronic applications such as liquid crystal display (LCD) touchscreens for smartphones, tablet and desktop computers, and televisions.

In one implementation, the illuminating helmet 100 is composed of graphene and uses electric current through, for example, strips of the graphene 225A-N via electrode pairs (e.g., electrodes 215A-N and 220A-N). This causes the graphene 225A-N to heat up and produce light. It is analogous to a glowing filament in traditional incandescent light bulbs, except on a microscopic scale. The graphene 225 heats up to about the same temperature as an incandescent light bulb filament, such as, for example, 4,532 degrees Fahrenheit (2,500 degrees Celsius), and produces visible light that can be seen by the naked eye. It should be appreciated that the graphene 225A-N may be larger or smaller strips of graphene as desired.

A thermal barrier material/coating may be applied between the head of the user and the graphene 225 to prevent any possible heat (generated by the graphene 225) from affecting the wearer (e.g., the player). In one implementation, a layer underneath the light source 50 (such as the inside layer 305 and/or the interior protection 350 in FIG. 3A) may include and/or be coating with a thermal barrier material, such as plastic, rubber, insulation, etc.

FIG. 3A depicts a portion of the illuminating helmet 100 with further details according to one or more embodiments. FIG. 3A illustrates an inside layer 305, with graphene layer 225 over the inside layer 305, and the outside layer 250 over the graphene layer 225. The inside layer 305 has interior protection 350 attached/provided underneath as a soft padding/cushion for the user's head. The interior protection 350 may be any suitable cushion capable of being fixed to the inside layer 305 as discussed herein. In one implementation, FIG. 3A may be made by adding a layer of graphene 225 between two transparent layers (for example, layers 250 and 305) of polycarbonate which protect the graphene 225 while it illuminates. The outside layer 250 and the inside layer 305 can be connected together by fasteners 360. The fasteners 360 can be connectors that hold the outside layer 250 and the inside layer 305. The fasteners 360 can be anchors, bolts, hardware, nails, nuts, pins, clips, rivets, rods, screws, sockets, clamps, hangers, washers, etc., which are used to hold the layers 250 and 305 together. In one implementation, the outside layer 250 and the inside layer 305 may be made as substantially a single layer with at least one or more openings to insert the graphene 225 between the outside layer 250 and the inside layer 305. In one implementation, the outside layer 250 and the inside layer 305 can be two separate layers, such that the (entire) outside layer 250 can be completely removed from the inside layer 305 instead of only a portion of the outside layer 250 being removable (entire outside layer 250 can be removable), thereby exposing the light source 50. The outside layer 250 can be reattached to the inside layer 305 by the fasteners 360.

The inside layer 305 may be a protective material, such as, for example, a polycarbonate, plastic, rubber, and/or mix of materials. In one case, the top of inside layer 305 may include and/or be coated with a reflective material. If the reflective material is conductive, the reflective material does not contact the graphene layer 225

The outside layer 250 is a protective material, such as, for example, a polycarbonate, plastic, rubber, and/or mix of materials. The outside layer 250 and/or at least a portion of the outside layer 250 may be transparent or semitransparent such that the light from the light source 50, for example, the graphene layer 225 (and/or organic light emitting diodes 1205 shown in FIG. 12), illuminates outward through the outside layer 205. In one implementation, the outside layer 250 may be tinted red, blue, green, yellow, orange, purple, etc., such that the light generated from the graphene layer 225 emanates through the tinted outside layer 250 with the desired hue.

In this example of FIG. 3A, the electrodes 215 and 220 are not explicitly illustrated as multiple pairs but are connected to provide electrical power as a power source 805 as understood by one skilled in the art. In one or more embodiments, the helmet 100 may not have an inside layer 305, and as such, the interior protection 350 is (directly) under the graphene 225.

In one implementation, the graphene layer 225 may be a mold and/or like a mold of graphene shaped in the curvature/design of the helmet 100. The mold of graphene layer 225 may be a sheet that is curved according to one or more curved parts of the helmet 100. The mold of the graphene layer 225 can be multiple sheets at different locations around the helmet 100. In one case, the mold of graphene layer 225 (and/or a plurality of graphene portions) may partially cover the helmet 100 (such as, for example, 25%, 30%, 40%, 50%, through 75%), nearly completely cover the helmet 100 (such as, for example, 60%, 70%, 80%, 90%, 95%, 99%, or even 100%) and/or be anywhere underneath the helmet 100, such as covering or being underneath any portion or combination of the left side, the right side, top, bottom, front, and/or back. As such, the mold of the graphene layer 225 (and/or a plurality of graphene portions 225A-225N) can be formed into the shape of any one or more portions of the helmet 100 and/or in the shape of the entire helmet 100 (except for any ventilation holes) as desired, in accordance with one or more embodiments. It should be appreciated that any one or more locations on the helmet 100 may be selected to place the graphene 225 (whether in the form of a mold, strip, and/or any kind of geometric shape) along with the required pairs of electrodes 215A-N and 220A-N. The mold of graphene 225 may be shaped to cover the curved inside layer 305 and/or be shaped to fit under the curvature of the outside layer 250. For any location of the graphene layer 225, there are at least one or more pairs of electrodes 220A and 215A, 220B and 215B, through 220N and 215N connected to each sheet of the graphene layer 225.

Figure 3B:
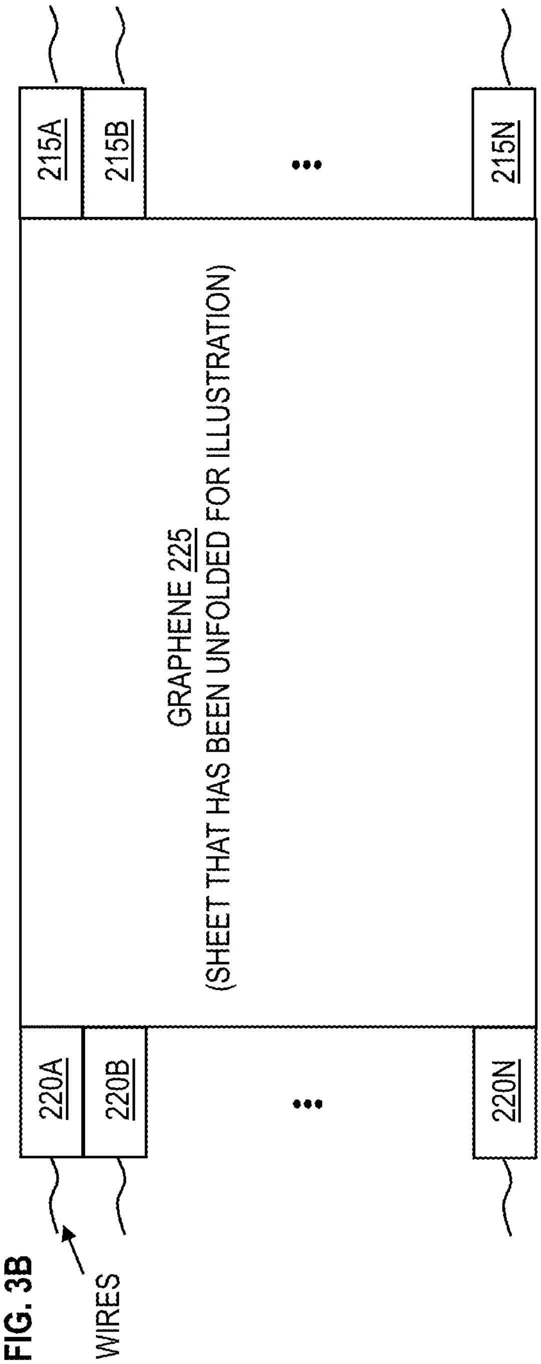
FIG. 3B depicts a graphene sheet with multiple electrode pairs connected according to one or more embodiments.
Figure 3C:
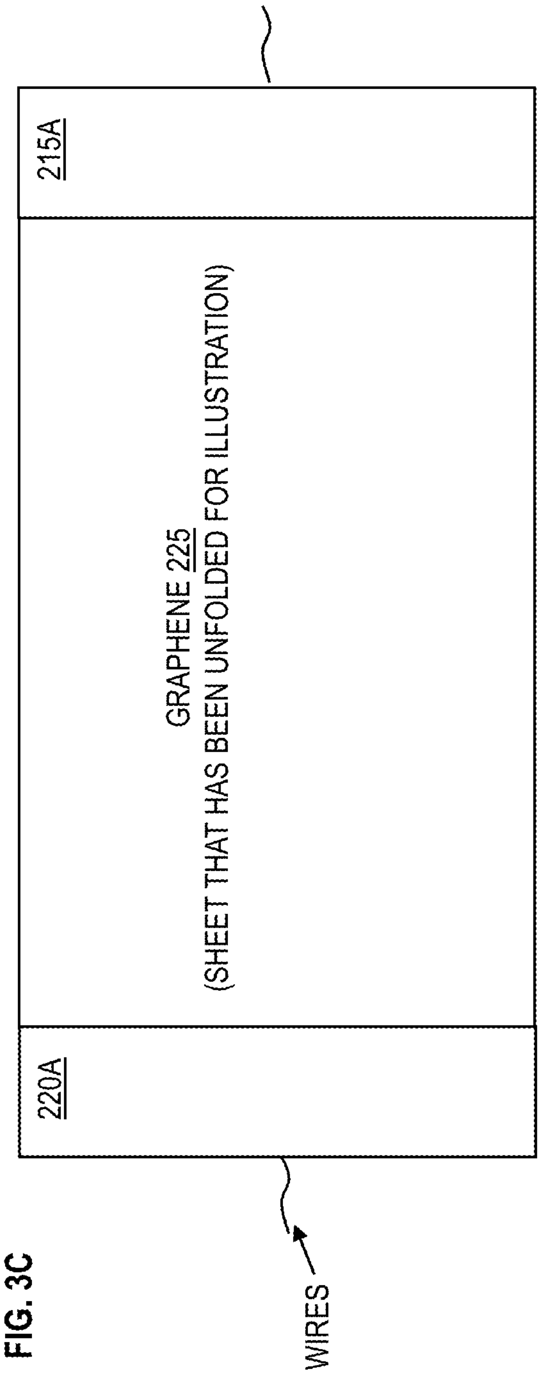
FIG. 3C depicts a graphene sheet with a large electrode pair connected according to one or more embodiments.

In one implementation for a mold of graphene layer 225, there may be a plurality of electrodes 215A-N on one end and a corresponding number of electrodes 220A-N on the other end of the (same) graphene layer 225, where the graphene layer 225 is a graphene sheet that fully encompasses and/or nearly encompasses the entire shape of the helmet 100 such that electrical current flows between pairs of electrodes 215A-N and electrodes 220A-N, as depicted in FIG. 3B. In another implementation for a mold (or sheet) of graphene layer 225, there may be a large electrode 215A on one end and a corresponding large electrode 220A on the other end of the graphene layer 225, where the graphene layer 225 is a graphene sheet that fully encompasses and/or nearly encompasses the entire shape of the helmet 100 such that electrical current flows between the two large electrodes 215A and electrodes 220A, as depicted in FIG. 3C. Using two large pair of electrodes in place of multiple pairs of smaller electrodes for the same size mold/sheet of graphene layer 225 may require a higher voltage and/or current. The entire sheet or nearly the entire sheet of the graphene 225 can illuminate in one case. In another case, there can be one or more parts of the sheet of graphene 225 that do not illuminate while other parts of the sheet of graphene 225 illuminate. Although not shown in FIGS. 3A, 3B, and 3C, one or more portions of the graphene 225 and/or the entire portion of graphene 225 can be suspended over the substrate 230.

Figure 4:
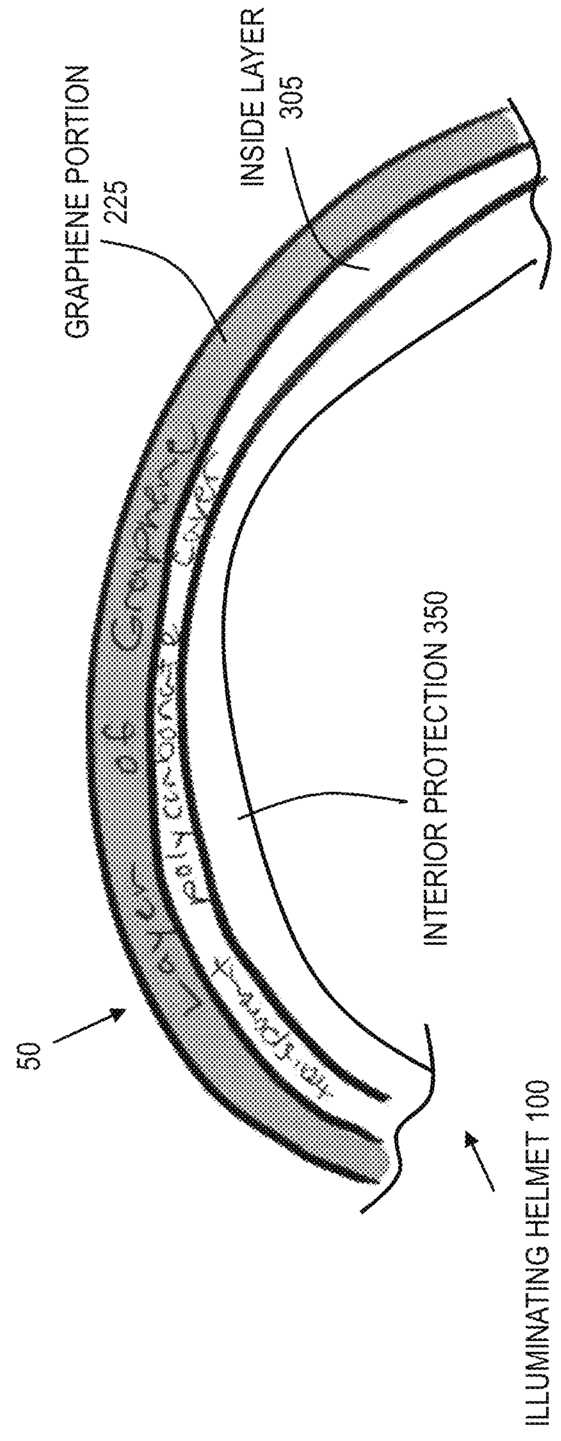
FIG. 4 depicts a portion of the illuminating helmet illustrating a layer of graphene on the outside of and/or on top of an inside layer according to one or more embodiments.

FIG. 4 depicts a portion of the illuminating helmet 100 illustrating a layer of graphene 225 on the outside of or on top of the inside layer 305 according to one or more embodiments. In one implementation, a non-conductive protective coating may be applied on top of the graphene layer 225 in FIG. 4. The protective coating applied on top of the graphene 225 can be a sealant. The protective coating may be water proof, scratch resistant, etc., and the protective coating can be polymers, epoxies, polyurethanes, etc.

Figure 5:
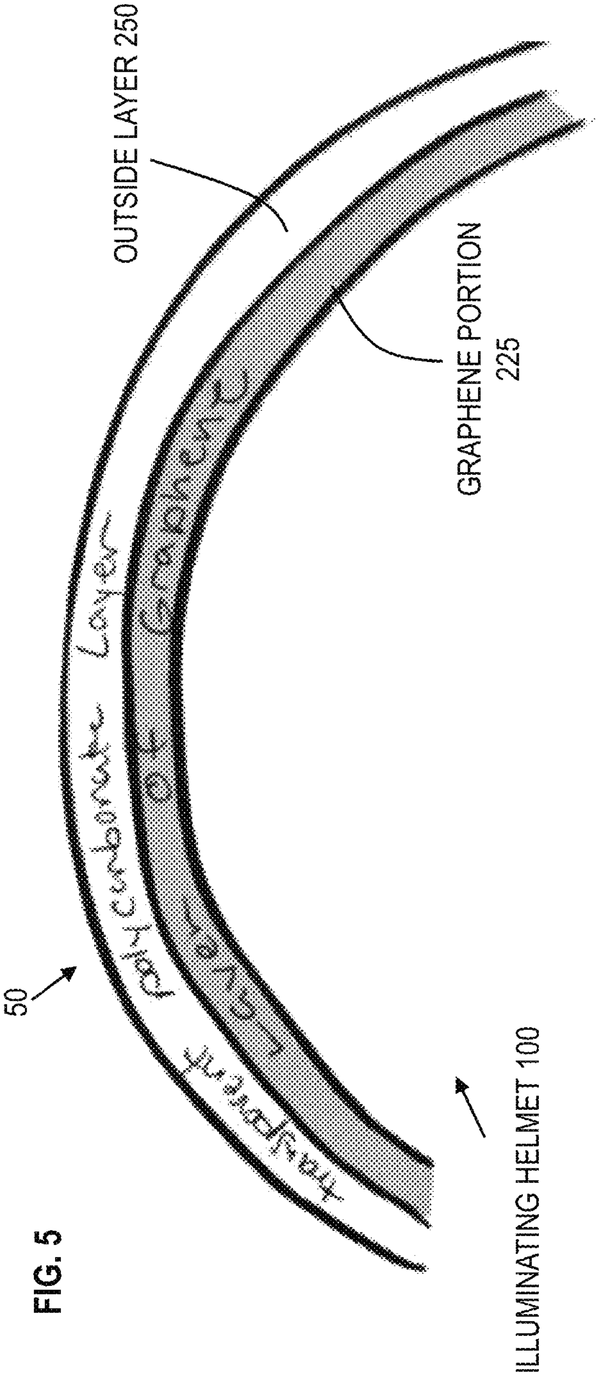
FIG. 5 depicts a portion of the illuminating helmet illustrating illumination according to one or more embodiments.

FIG. 5 depicts a portion of the illuminating helmet 100 illustrating illumination by placing a layer of graphene 225 (as a light source 50) on the inside of (i.e., underneath) a transparent polycarbonate shell according to one or more embodiments. FIG. 5 illustrates a transparent polycarbonate layer as the outside shell, and the graphene 225 is underneath to illuminate as discussed herein. Other layers are under the graphene 225, which would be in a typical helmet. In one case, the graphene 225 can be placed directly or indirectly on a portion of the interior protection 350 such that the graphene 225.

Figure 6:
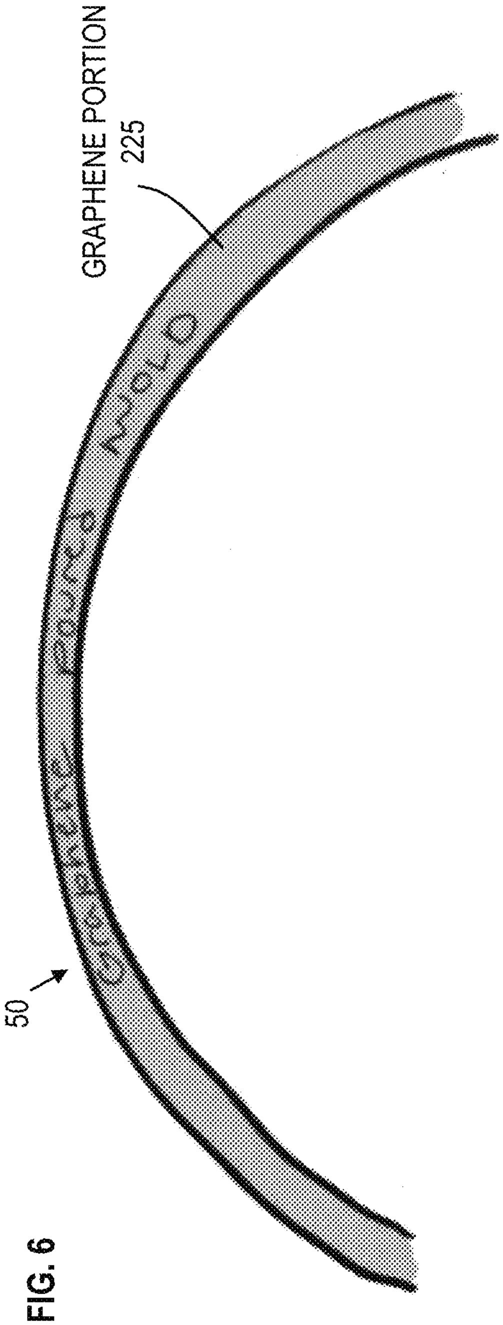
FIG. 6 depicts a graphene mold of graphene to be utilized for the illuminating helmet according to one or more embodiments.

FIG. 6 depicts a graphene mold of graphene 225 to be utilized for the illuminating helmet 100 according to one or more embodiments. In the formation of helmets (head gear), polycarbonate pellets are formed into a mold to make a polycarbonate shell (such as, for example, the outside layer 250 and/or inside layer 305). In one case, a graphene mold may be achieved in a similar manner by replacing the polycarbonate shell with graphene and pouring a graphene mold of the shell of the head gear. In another case, the graphene mold may be formed by conforming/shaping a graphene sheet into the curved shape designed from the polycarbonate shell, such that the graphene mold is configured to fit inside the polycarbonate shell or on top of the polycarbonate shell.

Figure 7A:
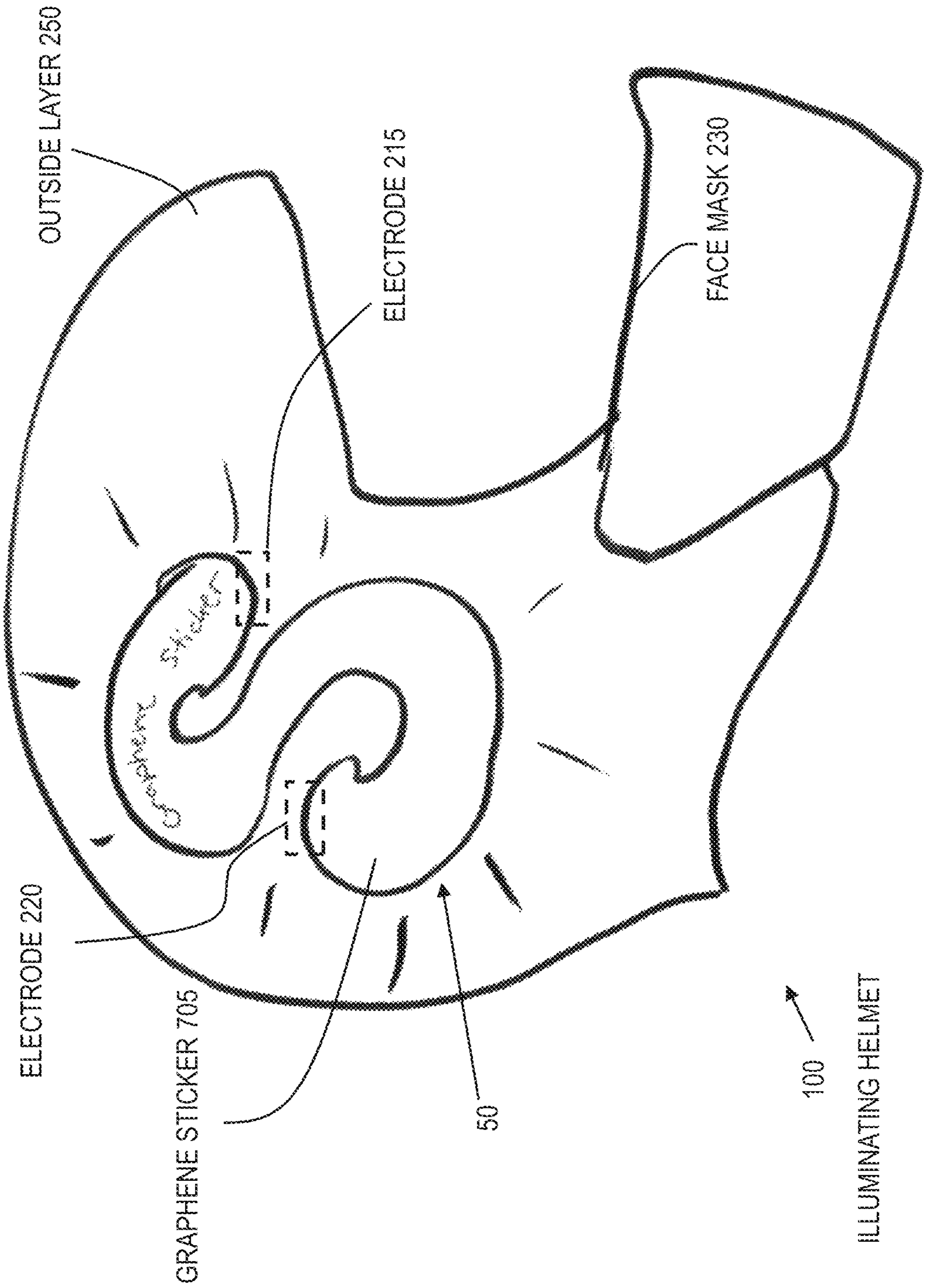
FIG. 7A depicts an example of the illuminating helmet according to one or more embodiments.
Figure 7B:
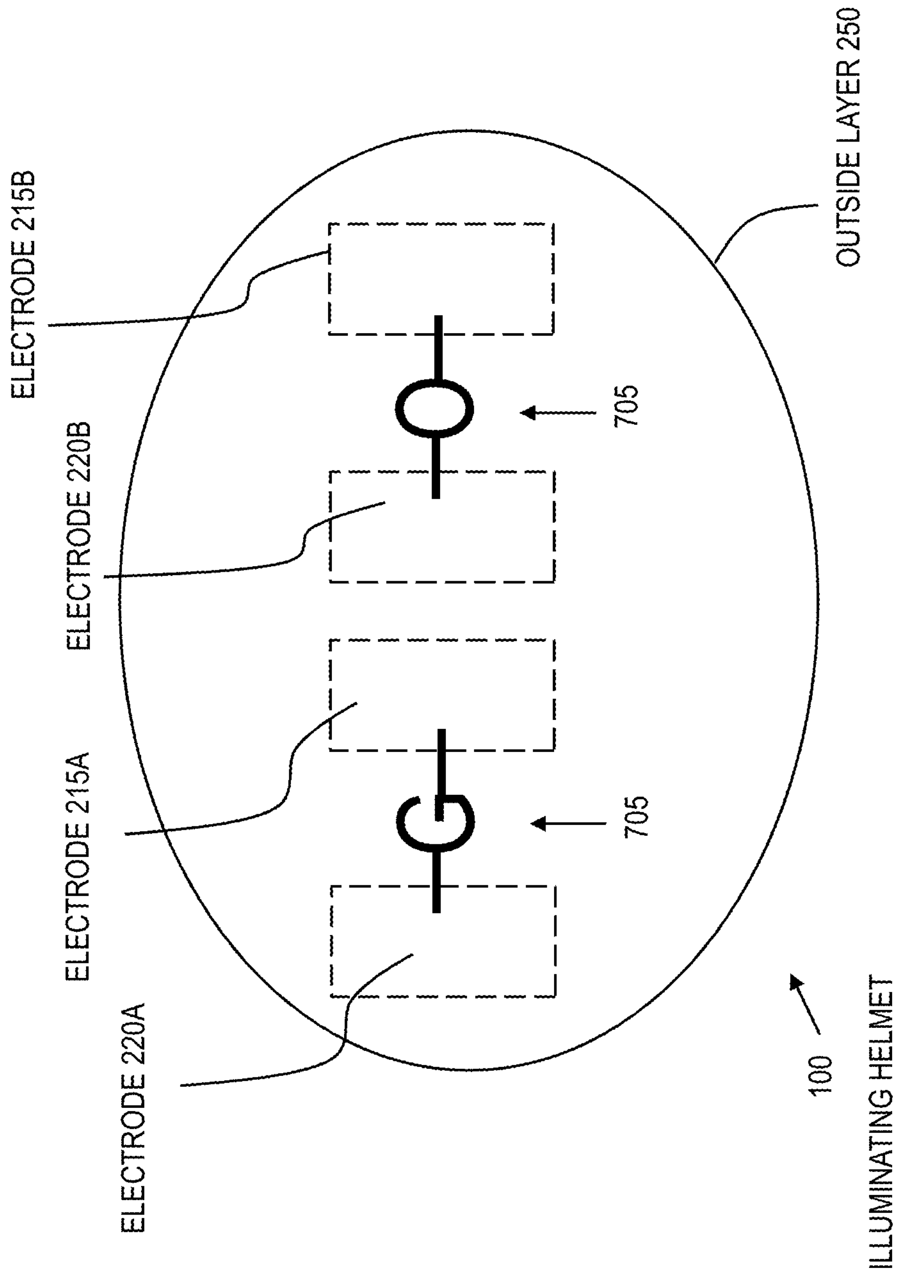
FIG. 7B depicts an example of graphene stickers (and/or a removable graphene shapes) applied to electrodes according to one or more embodiments.
Figure 7C:
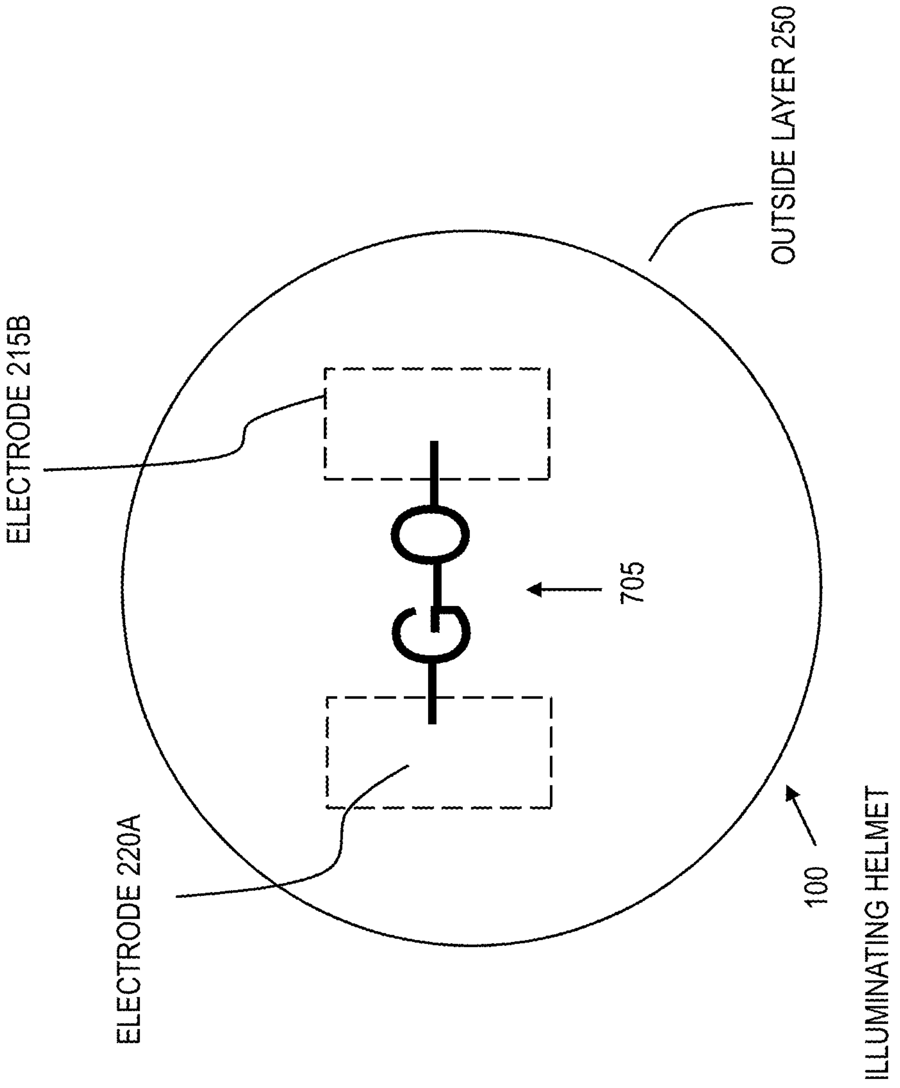
FIG. 7C depicts an example of graphene stickers (and/or a removable graphene shapes) applied to electrodes according to one or more embodiments.
Figure 7D:
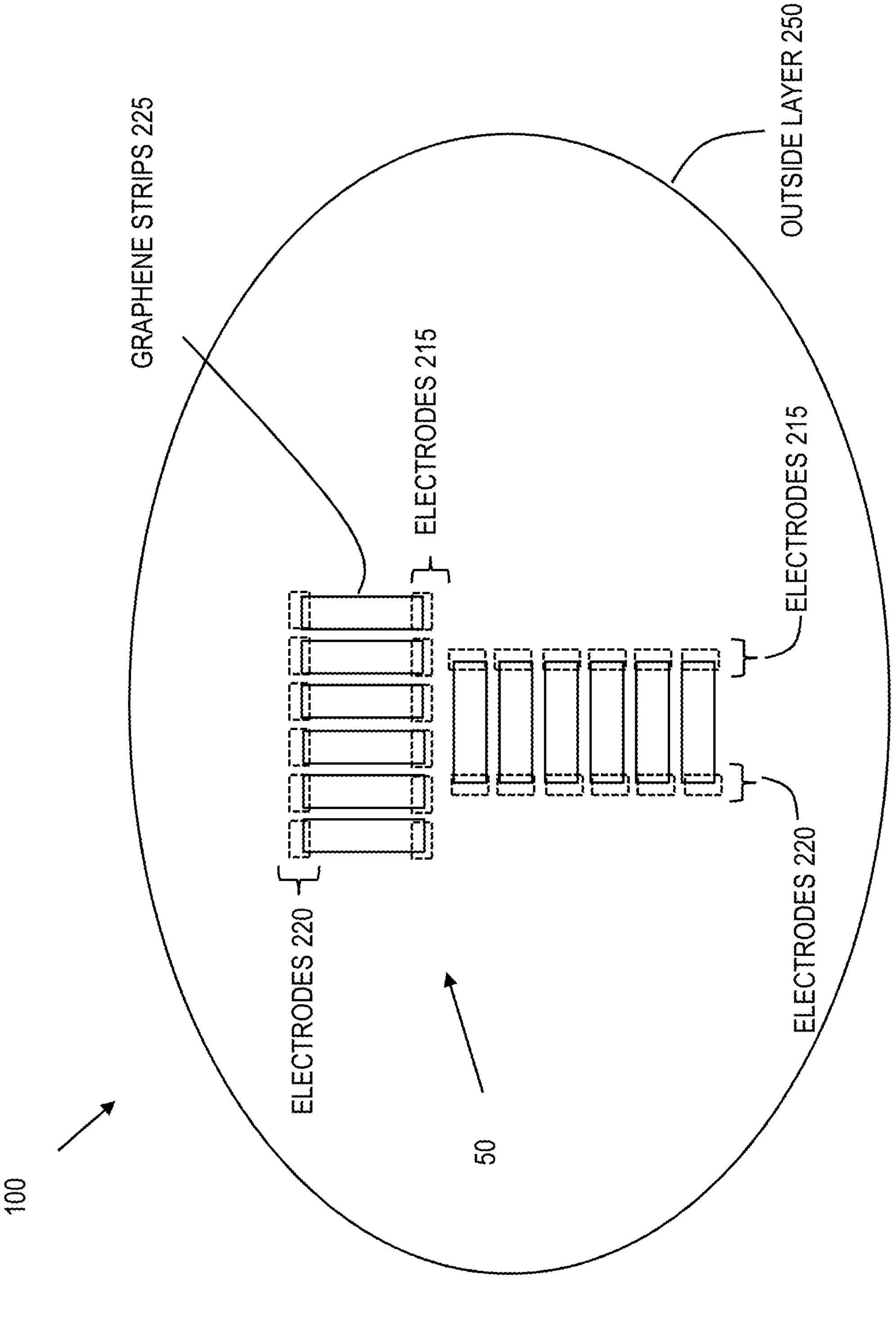
FIG. 7D depicts graphene strips formed into an example shape in the helmet according to one or more embodiments.

FIG. 7A depicts an example of the illuminating helmet 100 according to one or more embodiments. FIGS. 7B, 7C, and 7D depict other examples of the illuminating helmet 100 according to one or more embodiments. In FIGS. 7A, 7B, 7C, and 7D one or more graphene stickers 705 may be added and/or removed from the helmet 100. In this way, the helmet 100 can be illuminated by adding a graphene sticker 705 of a certain image to the transparent and/or non-transparent outside layer 250 of the headgear. The graphene sticker 705 is designed to adhere (be fixed) to the outside layer 250 (or any other portion of the helmet 100), such that an electrical connection is made between electrodes 215 and 220 through the graphene sticker 705. Depending on the shape of the graphene sticker 705, more electrodes pairs can be utilized to illuminate the graphene sticker 705. There may be some segments of the graphene sticker 705 (and graphene layer/portions 225) that illuminate more brightly than other segments. There may be an adhesive applied to a front side (i.e., on top) of the graphene sticker 705 and portions of the helmet 100 as a coating to cause the graphene sticker 705 to adhere to the helmet. Additionally and/or alternatively, there may be an adhesive applied to a back side of the graphene 705 to adhere to helmet.

A protective coating may be formed over the front and back of the graphene sticker 705 to protect it. The protective coating may be non-conductive, transparent, and/or semi-transparent. As noted above, the protective coating may be water proof, scratch resistant, etc., and the protective coating can be polymers, epoxies, polyurethanes, etc. At least two openings are formed through the protective coating such that electrical contact can be made to the electrodes 215 and 220 for illumination. In one case, the electrical contact openings may be on the backside of the graphene sticker 705. In others cases, the electrical openings may be on the edges, sides, back, front, and/or any combination of openings.

There may be at least two conductive portions (for example, leads, prongs, attachments, bumps, etc.) attached to the graphene sticker 705 at the two openings such that the conductive portions can contact and/or mate with the electrodes 215 and 220 in order to power the graphene sticker 705 for illumination. In one implementation, there may be recesses in the outside layer 250 to accommodate the two conductive portions of the graphene sticker 705 and to provide a slot for the two conductive portions to fit in without causing the graphene sticker 705 to be raised. Although two openings corresponding to electrodes 215 and 220 are discussed for explanation purposes, it should be appreciated that any number of pairs of openings may be formed in the graphene sticker 705 to match the pairs of electrodes 215A-N and 220A-N. Also, the graphene sticker 705 may be a continuous piece of graphene, and/or the graphene sticker 705 may be multiple portions/strips of graphene that are arranged to form the graphene sticker 705 of the desired shape. When multiple portions/strips of graphene are utilized to form the shape of the graphene sticker 705, multiple pairs of electrodes 215A-N and 220A-N may be utilized. The protective coating may be utilized to maintain (or secure) the multiple portions/strips of graphene in the desired shape of the graphene sticker 705.

Various geometric shapes, alphabets, numbers, animals, shapes, pictures, etc., may be formed into graphene stickers 705. Also, the layer of graphene 225, sheet of graphene 225, and/or strips of graphene 225 can be formed into any of desired shapes discussed herein, even if the graphene 225 is not a sticker. The graphene stickers 705 are replaceable such that the openings in the protective material matches (corresponds) to the location of the pair or pairs electrodes 215A-N and 220A-N.

FIG. 7B depicts an example of graphene stickers 705 (and/or a removable graphene shape) can be applied to electrodes according to one or more embodiments. In one option, the stickers 705 can be applied to the outside layer 250 of the helmet 100, and at least one part of the sticker 705 is connected to an electrode pad 220A and another part of the sticker 705 is connected to the electrode pad 215A. The electrode pads are made of conductive material which is connected to the power source 805. In another option, a portion of the outside layer 250 can be removable (i.e., can be opened and closed with, for examples, fasteners 360) such that the sticker 705 is attached to the electrode pads 220 and 215, and the transparent top portion of the outside layer 250 can be reattached (by, for example, a player, coach, parent, and/or at an assembly plant).

The stickers 705 can have a predefined size predetermined to match the spacing requirements of the electrode pads 215 and 220. In the illustration of FIG. 7B, word "GO" is illuminated using stickers 705 with two different electrode pairs 215 and 220. In another implementation, the word "GO" could be on a single graphene sticker 705 and be powered by one or more pairs of electrodes 215 and 220 as depicted in FIG. 7C. It should be appreciated that there a various ways in which the graphene stickers 705 and the graphene 225 can be operatively connected to the pairs of electrodes 215 and 220. FIGS. 7B and 7C shows that small conductive lines (which may graphene or another conductive material) are connected to the electrode pads 215 and 220. In other cases, the shape of the letter (e.g., "G") can be directly connected to the electrode pads 215 and 220 itself, without having small conductive lines.

FIG. 7D depicts graphene strips 225 formed into an example shape in the helmet 100 according to one or more embodiments. The graphene strips 225 can be a graphene sticker 705 having a backing that contacts electrodes 215 and 220. Also, the graphene strips 225 can be within one or more predefined locations 205 of the outside layer 250 and covered by a top layer of the outside layer 250 for protection, such that the graphene strips 225 form the shape of the letter "T" for the team having a mascot or name beginning with the letter "T". Each strip of graphene 225 can be separately connected to its own pair electrodes 215 and 220, as understood by one skilled in the art.

Figure 8:
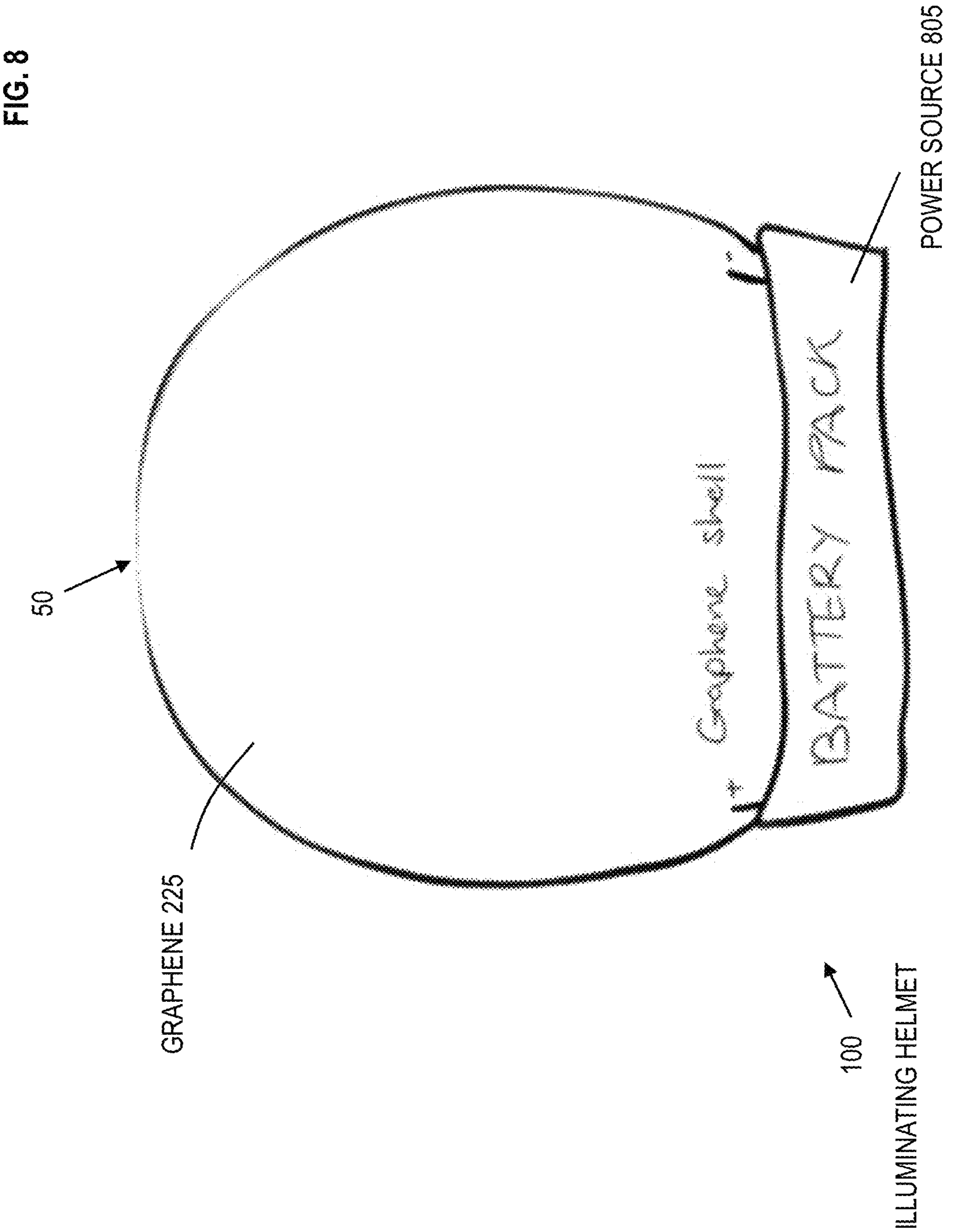
FIG. 8 depicts an example of the illuminating helmet according to one or more embodiments.

FIG. 8 depicts an example of the illuminating helmet 100 according to one or more embodiments. FIG. 8 shows a power source 805 at the back of the helmet. The power source 805 connects to the graphene 225. The power source 805 may be a battery pack, such as a rechargeable battery pack. In one case, the graphene 225 may be a graphene shell connected to the power source. In another case, the graphene 225 may be multiple strips, portions, and/or (partial) molds of graphene connected by pairs of electrodes 215A-N and 220A-N. Although not shown, a transparent outer shell (for example, outside layer 250) can be attached to the graphene shell 225.

Figure 9:
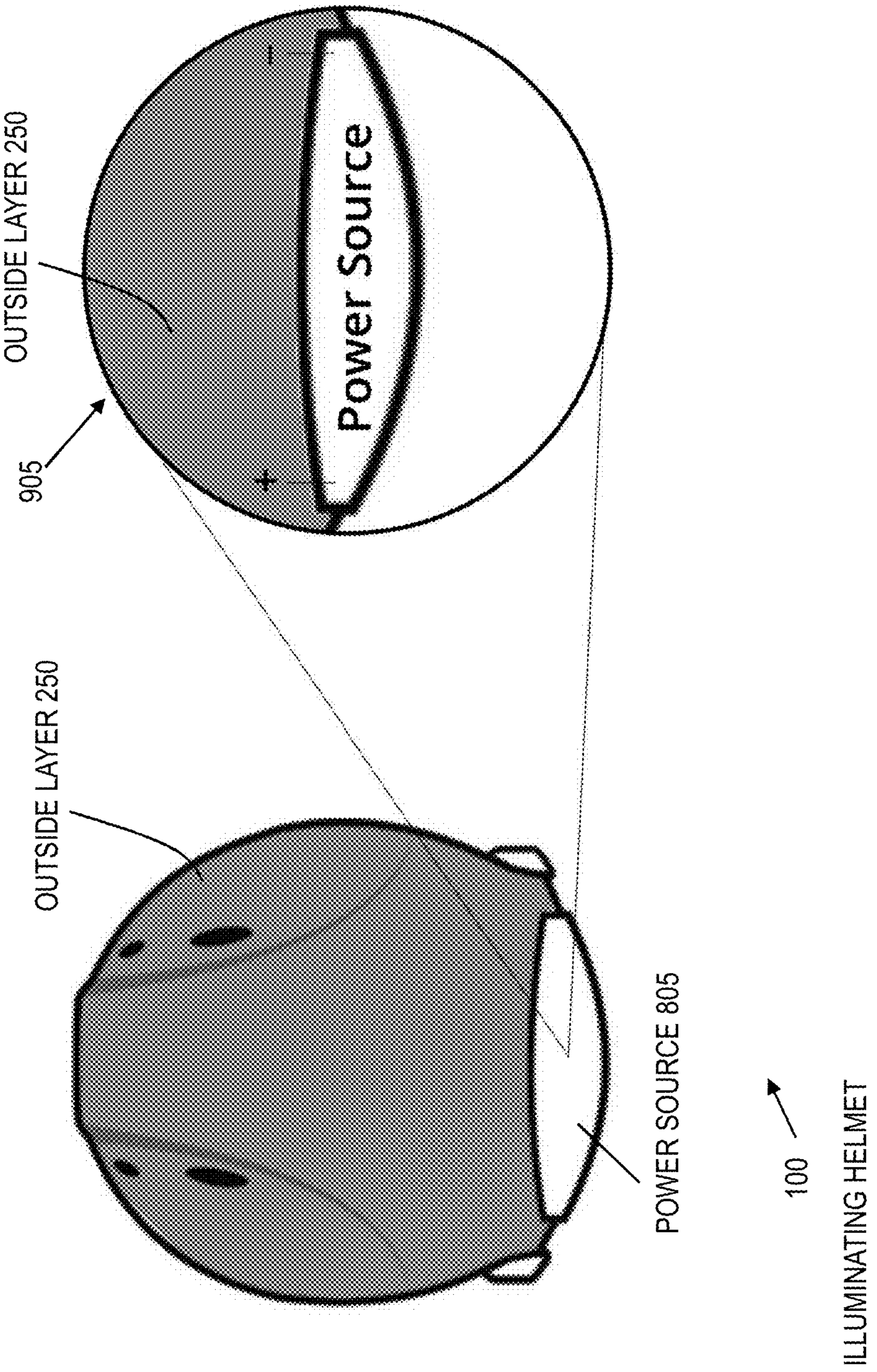
FIG. 9 depicts an example of the illuminating helmet according to one or more embodiments.

FIG. 9 depicts an example of the illuminating helmet 100 according to one or more embodiments. The power source 805 is shown in an enlarged view 905. In this example, the graphene 225 is underneath the outside layer 250 and illuminates when power is received from the power source 805. Positive and negative wires from the power source 805 (power supply) are attached to the graphene 225 (via electrodes not shown) and allow the helmet 100 (i.e., graphene) to illuminate. Particularly, wires connect the positive terminal of the power source 805 to the electrodes 220. Also, wires connect the negative terminal of the powers source 805 to the electrodes 215.

Figure 10:
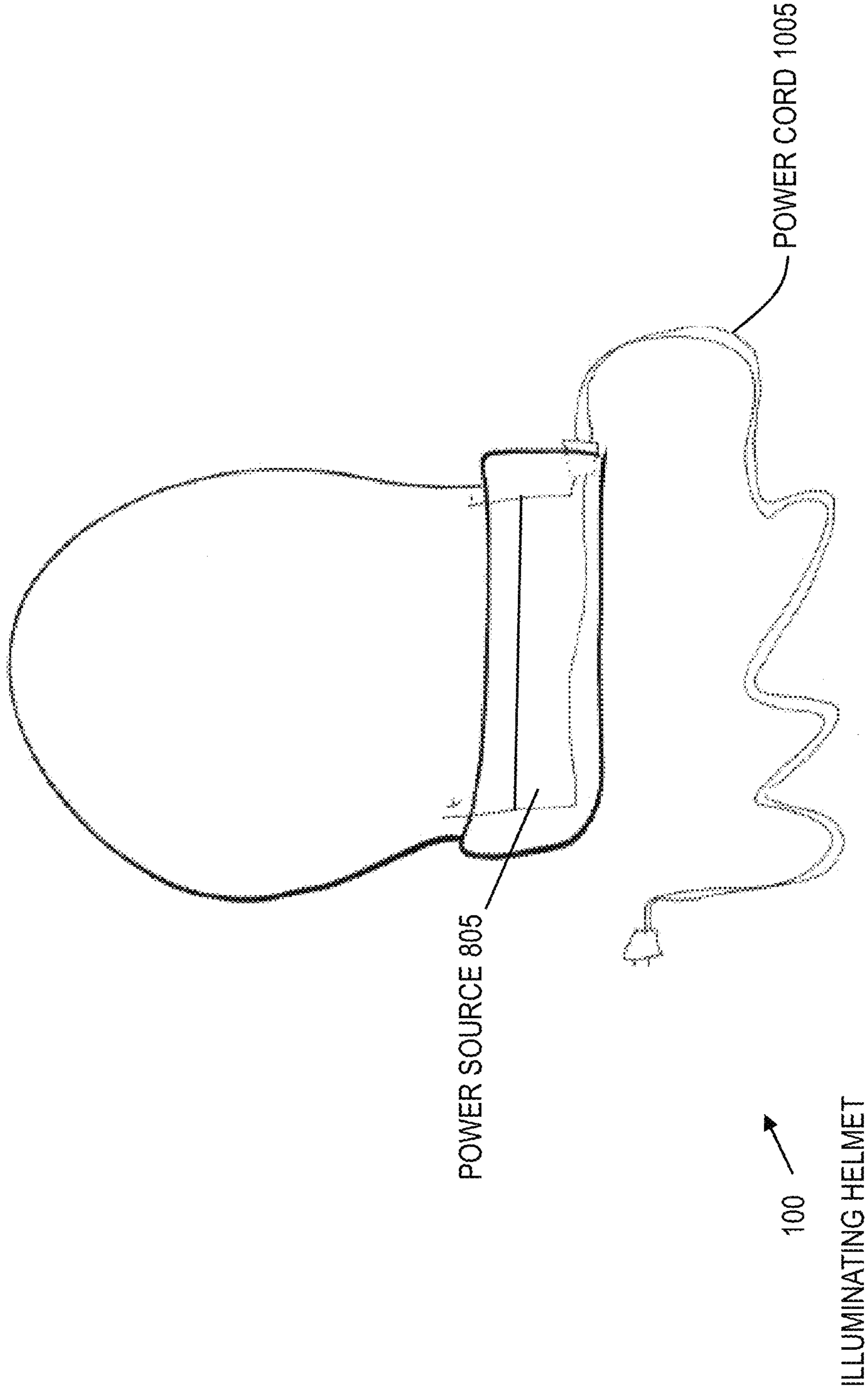
FIG. 10 depicts an example of the illuminating helmet according to one or more embodiments.

FIG. 10 depicts an example of the illuminating helmet 100 according to one or more embodiments. FIG. 10 illustrates that the power source 805 may be connected to an outlet for charging via a power cord 1005. Using the power cord 1005, the power source 805 may be charged via a USB port and/or regular 120 volt outlet. Also, the power source 805 may be charged wirelessly and/or inductively via a wireless charger or wireless charging pad.

Figure 11:
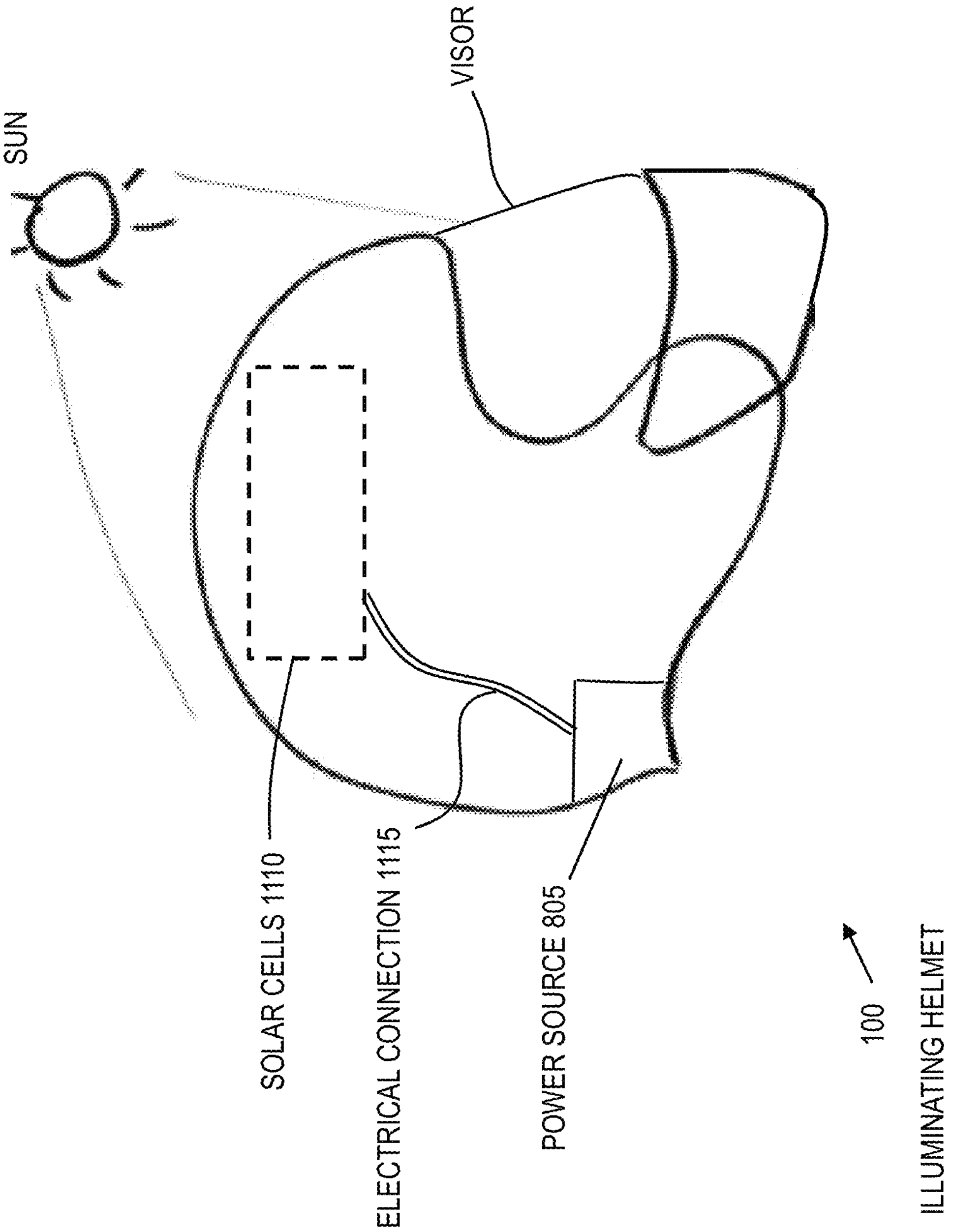
FIG. 11 depicts an example of the illuminating helmet according to one or more embodiments.

FIG. 11 depicts an example of the illuminating helmet 100 according to one or more embodiments. FIG. 11 illustrates that the power source 805 may be charged via one or more solar cells 1110 (photovoltaic cells) that converts the light into electrical energy and transfers the electrical energy to the power source 805 via an electrical connection 1115. The power source 805 can include one or more battery packs for storing energy until needed In one implementation, the power source 805 and/or the graphene 225 may be powered by converting kinetic movement/energy into electricity allowing the head gear to charge when in motion. One or more transducers may be embedded in the outsider layer 250 to receive contact/pressure from a hit, and the transducers convert the impact into electricity used to charge the power source 805. The transducer may be a piezoelectric material.

In one case, the helmet 100 may have a thin aluminum battery that stores and uses energy collected from the inside of the helmet. The inside of the helmet has a layer of zinc oxide within the padding in order to collect and store the energy which can power the helmet play-by-play.

Figure 12:
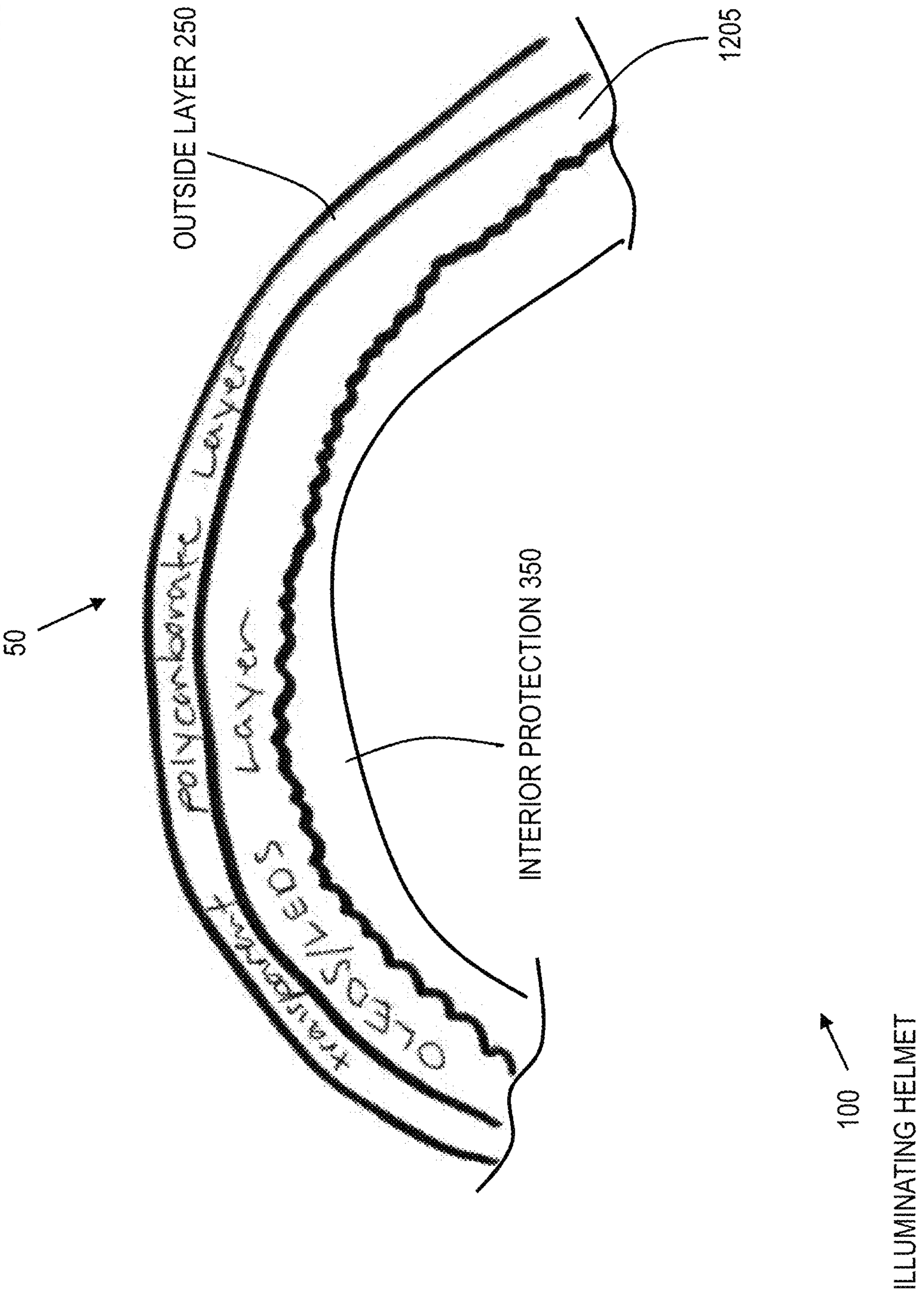
FIG. 12 depicts an example of the illuminating helmet according to one or more embodiments.

FIG. 12 depicts an example of the illuminating helmet 100 according to one or more embodiments. FIG. 12 illustrates a different light source 50, which can be layer of organic light emitting diode (OLEDs/LEDs) 1205. The OLED/LED layer 1205 may be utilized separately and/or in combination with the graphene 225 as the light source 50. The OLEDs/LEDs 1205 can be placed either on the inside or outside (or both) of the transparent polycarbonate head gear shell (e.g., the outside layer 250).

It should be appreciated that any discussion above for the graphene 225 may be replaced with organic light emitting diodes 1205 (or light emitting diodes) as the light source 50 and/or combined with the organic light emitting diodes 1205.

FIG. 13 is an example of a football helmet showing various details. One or more features of the helmet in FIG. 13 may be utilized with and incorporated in one or more embodiments discussed herein. Also, one or more embodiments may be incorporated in features of the helmet in FIG. 13.

Figure 14:
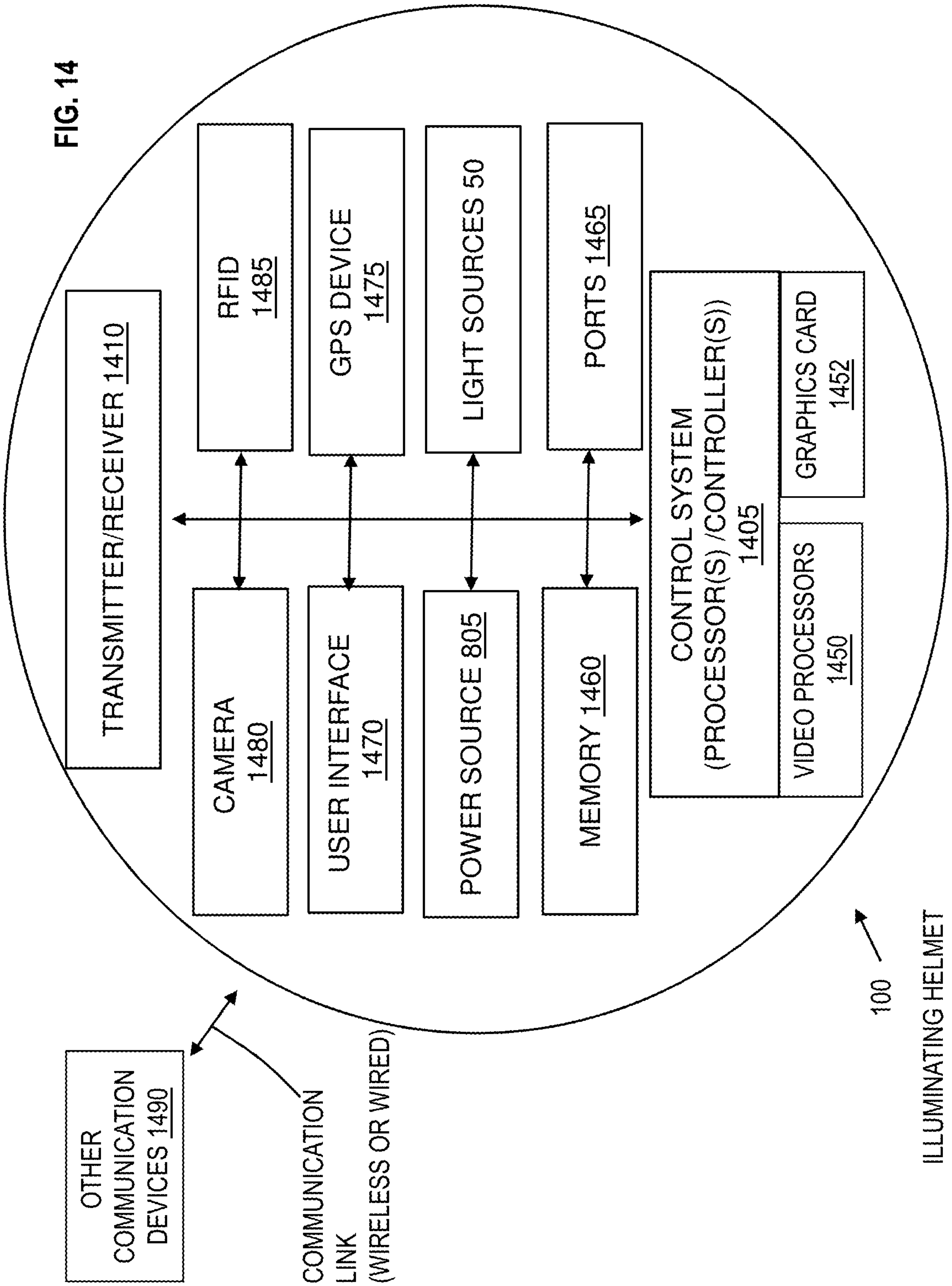
FIG. 14 illustrates the football helmet with a control system according to one or more embodiments.

FIG. 14 illustrates the football helmet 100 with a control system 1405 according to one or more embodiments. The control system 1405 is configured to operate and control the illumination of the light sources 50 which include graphene 225 (including graphene stickers 705) and/or OLEDs/LEDs 1205. The control system 1405 is designed to turn on and off one or more portions of graphene 225 (graphene stickers 705) and/or the OLEDs/LEDs 1205. One or more portions of graphene 225 (graphene stickers 705) and/or the OLEDs/LEDs 1205 may be turned on (illuminate) when one or more portions of graphene 225 (graphene stickers 705) and/or OLEDs/LEDs 1205 are turned off. The control system 1405 and/or helmet 100 may include one or more features of the computer 1500 in FIG. 15.

The helmet 100 may also include a transmitter/receiver 1410 (transceiver) to receive signals outside of the helmet 100 to control helmet functionality of illumination via the control system 1405. The control system 1405 controls the functionality of the illumination the graphene 225 (graphene stickers 705) and/or OLEDs/LEDs 1205. Graphene helmet functionality can be controlled/programmed (via the control system 1405) by wireless signals sent via Bluetooth™ transmission to the transmitter 1410. Graphene helmet functionality can be controlled/programmed (via the control system 1405) by wireless signals sent via WiFi. Graphene helmet functionality can be controlled/programmed (via the control system 1405) by signals sent via a SIM card. Graphene helmet functionality can be controlled/programmed (via the control system 1405) by signals sent via satellite. Graphene helmet functionality can be controlled/programmed (via the control system 1405) by signals sent via a cord from headgear to a smart device such as PC, laptop, cell phone, etc. Graphene helmet functionality can be controlled/programmed (via the control system 1405) by signals sent via email. Graphene helmet functionality can be controlled/programmed (via the control system 1405) by signals sent via RFID 1485. Additionally, the control system 1405 can control which light source 50 illuminate and which ones do not. Some portions and/or strips of graphene 225 (OLEDs/LEDs 1205) can illuminate while others do not and vice versa. The control system 1405 can cause the lights sources 50 to illuminate with a desired pattern, scheme, etc., by controlling the power to respective pairs of electrodes 215 and 220 and pairs of electrodes 1705 and 1715. Any of the lights sources 50 can be arranged in a grid and/or matrix (for example, as a display screen in one or more parts of the helmet 100), such that the control system 1405 can control the display of individual cells (for example, individual graphene (strips/portions) 225 and/or individual LEDs/OLEDs 1205). The control system 1405 may include a video processor 1450 and/or graphics card 1452 to control the individual display of the cells (i.e., individual graphene (strips/portions) 225 and/or individual LEDs/OLEDs 1205). Each cell can be individually connected to a pair of electrodes 215 and 220, such that each cell is individually controlled. Additionally, the control system 1405 may include the functionality of the video processor 1450 and/or graphics card 1452.

The helmet 100 includes the transmitter/receiver 1410 (or transceiver) and ports/slots 1465 to communicate with other communication devices 1490. The transmitter/receiver 1410 includes one or more antennas, and the transmitter/receiver 1410 is configured to transmit and receive radio wavers. The ports/slots 1465 allow direct access to control the helmet 100, and to upload and download data to and from the memory 1460. Any part of the helmet 100 can be accessed via the ports/slots 1465 by using cables/plugs such as USD cables, HDMI cables, Ethernet cables, etc. The other communication devices 1490 include/represent cellphones, tablets, smart fields, smart stadiums, smart footballs/balls, computers, etc., each having its own transmitter/receiver and/or access to a transmitter/receiver for communicating with the helmet 100. The other communication devices 1490 can communicate by a wired communication link via one or more ports 1465 of the helmet 100.

In some cases, communication signals received by the helmet 100 from the other communication devices 1490 can cause the helmet 100 to illuminate. The control system 1405 can use the received signal as a trigger to illuminate the light source 50. In a scenario, the helmet 100 can receive a signal from a smart football (e.g., a communication device 1490) that makes the light source 50 light up. The smart football can have a transmitter/receiver, controller, and battery, such that the transmitter/receiver is configured to send a signal to the transmitter/receiver 1410 in the helmet 100. For example, the transmitter/receiver 1410 in the helmet 100 receives a wireless signal from the football's transmitter/receiver, and the received signal causes the control system 1405 (video processor 1450 and/or graphic card 1452) to instruct the helmet 100 light up (i.e., make the light source 50 illuminate) immediately and/or at predefined time.

In one scenario, the transmitter/reciever 1410 of the helmet 100 can receive (wireless) signals from a transmitter/receiver of a smart field and/or football, such that every time the football is down on the smart field (or down on the ground in general), the football sends a signal to the transmitter/receiver 1410 of the helmet 100 that makes the helmet 100 light up red (or any color) (i.e., the light source 50 illuminates).

Additionally, the transmitter/receiver 1410 in the helmet 100 can receive a (wireless) signals from the transmitter/receiver in a cellphone, tablet, computer, and/or any device capable of sending a wireless signal which makes the helmet 100 light up.

The transmitter/receiver 1410 in the helmet 100 can communicate with a transmitter/receiver in a stadium, football, smart turf, and/or a computer (or portable device) (which can be, for example, communication devices 1490). For example, as the player wearing the helmet 100 scores a touchdown by running across the smart turf, the transmitter/receiver (of stadium, football, smart turf, and/or computer/portable device) sends a (wireless) signal to the transmitter/receiver 1410 in the helmet 100, and the control system 1405 (the video processor 1450 and/or graphics card 1452) causes the light source 50 to illuminate and/or flash the word "touchdown" across the helmet 100 on one or more sides (and/or the front, back, top, sides, etc.) of the helmet 100. As the helmet 100 is displaying touchdown on one or more sides of the helmet 100, the transmitter/receiver 1410 can send a signal to the stadium's transmitter/receiver which then will allow the stadium to shoot off fireworks, play music, etc.

The helmet 100 can also use a network connection, including connecting to the Internet to transmit and receive data via ports 1465 (such as by using a USB cord connected to a computer, cellphone, etc.) and/or via a wireless connection by the transmitter/receiver 1410. Via the Internet (such as a web portal and/or webpage), through the transmitter/receiver 1410, and/or through direct connection to the port 1465, the helmet 100 can communicate with the football (having a transmitter/receiver), field (having a transmitter/receiver), stadium (having a transmitter/receiver such as in a kiosk), and fans via cellphone or other electronic devices using the TCP/IP (transmission control protocol/Internet Protocol). Any such device 1490, can communicate with the helmet 100 to cause the light sources 50 to illuminate in a predefined manner (flash, blink, constant illumination, etc.) and/or at a predetermined time (when crossing the goal line, at the 50 yard line, when initially entering the field, when checking/substituting into the game, etc.). Also, the helmet 100 includes a user interface 1470 (e.g., touch screen, keyboard, etc.) and/or connections for the user interface 1470, such that user can program the desired illumination for the light source 50 of the helmet 10. The user interface 1470 can control functionality of the helmet 100. For example, the touch screen section (i.e., user interface 1470) can be used to visit webpages (to download illumination patterns, words, pictures, etc.), turn on and off the helmet 100, etc.

The helmet 100 can include memory 1460 for storing the programmed pattern of illumination, the predefined time for illumination, one or more triggers for illumination, etc. The helmet 100 can also track, store, and share a player's data and every move via satellite, Bluetooth, RFID, and/or any other telecommunication. The helmet 100 can include a GPS device 1475 that provides the position of the player wearing the helmet 100 on the field, and the GPS device 1475 can communicate with satellites (which is represented as one of the other communication devices 1490).

The helmet 100 can have a camera 1480. The camera 1480 may be on the visor of the helmet 100. The camera 1480 can record and store the video captured from the visor in its memory 1460. The memory 1460 can be a built in internal hard drive, flash memory, etc.

The helmet 100 has a port/slot 1465 to enter a SIM (Subscriber Identity Module) card to communicate with a cellphone tower. For example, the helmet 100 may receive cellular service. The helmet 100 has a cellular antenna (for example, transmitter/receiver 1410 as understood by one skilled in the art) allowing the helmet 100 to have a cellular service, such that the helmet 100 is used to relay the data back and forth from the helmet to the cellphone/computer (i.e., the communication devices 1490). As well the cellular service via the SIM card and/or wireless connection to the Internet via the transmitter/receiver 1410 can allow the player (using the helmet 100) to download software application (apps) to the memory 1460 of the helmet 100. The software applications allow the helmet to have more features like a cell phone. For example, a little league player downloads an app that allows a real game video of his favorite professional player to illuminate/display on both sides of the helmet 100 and say "GOOD JOB" before the helmet 100 returns back to its original state after the player makes a tackle, scores a touchdown, catches a pass, hits the ball, etc. It should be understood that any trigger can be predefined to cause the light source 50 to illuminate in a predefined manner. As noted above, the player can download an app from his phone or computer by plugging up the helmet 100 with, for example, into a USB cord (via ports 1465) connected to his phone or computer. The player can also download the app through connecting the helmet to the Internet via Bluetooth or any other wireless connection. The player can also save, store, and share the game footage recorded by his visor via a cellular service, by a USB cable, by Bluetooth connection, etc.

As noted earlier, the helmet 100 includes internal memory/hard drive (memory 1460). In the memory 1460, the play by play action is recorded (via camera 1480) and stored. As such, the helmet 100 can record and store all of the plays from the game earlier and save them until the player can download or share theme. Also, the memory 1460 stores the programmed data for the functionality of the helmet 100, and the control system 1405 (including processors) is configured to execute instructions in the memory 1460. Software applications help control the functionality of the helmet 100.

As noted above, the helmet 100 has a GPS device 1475 to communicate with satellites (for example, communication devices 1490). In the helmet 100, the GPS device 1475 is used to track and record (in memory 1460) a player's placement on the field. The GPS device 1475 is also used to track the player's movement as well as speed during a game. For example, a player can set a timer (via a downloaded software application) on the helmet 100 to activate at game time. Once activated, the helmet 100 is recording via camera 1480 the visuals, audio, and even each step the player takes during the game via satellite. After the game, the player can store and/or share the data. The helmet visor can also show the placement of the other teams' players with respect to the location of the helmet via the GPS device 1475 and satellite. Using the satellite signal, the player's helmet "lights up" when the player scores a touchdown, because the location of the goal line can be preprogrammed.

Figure 16:
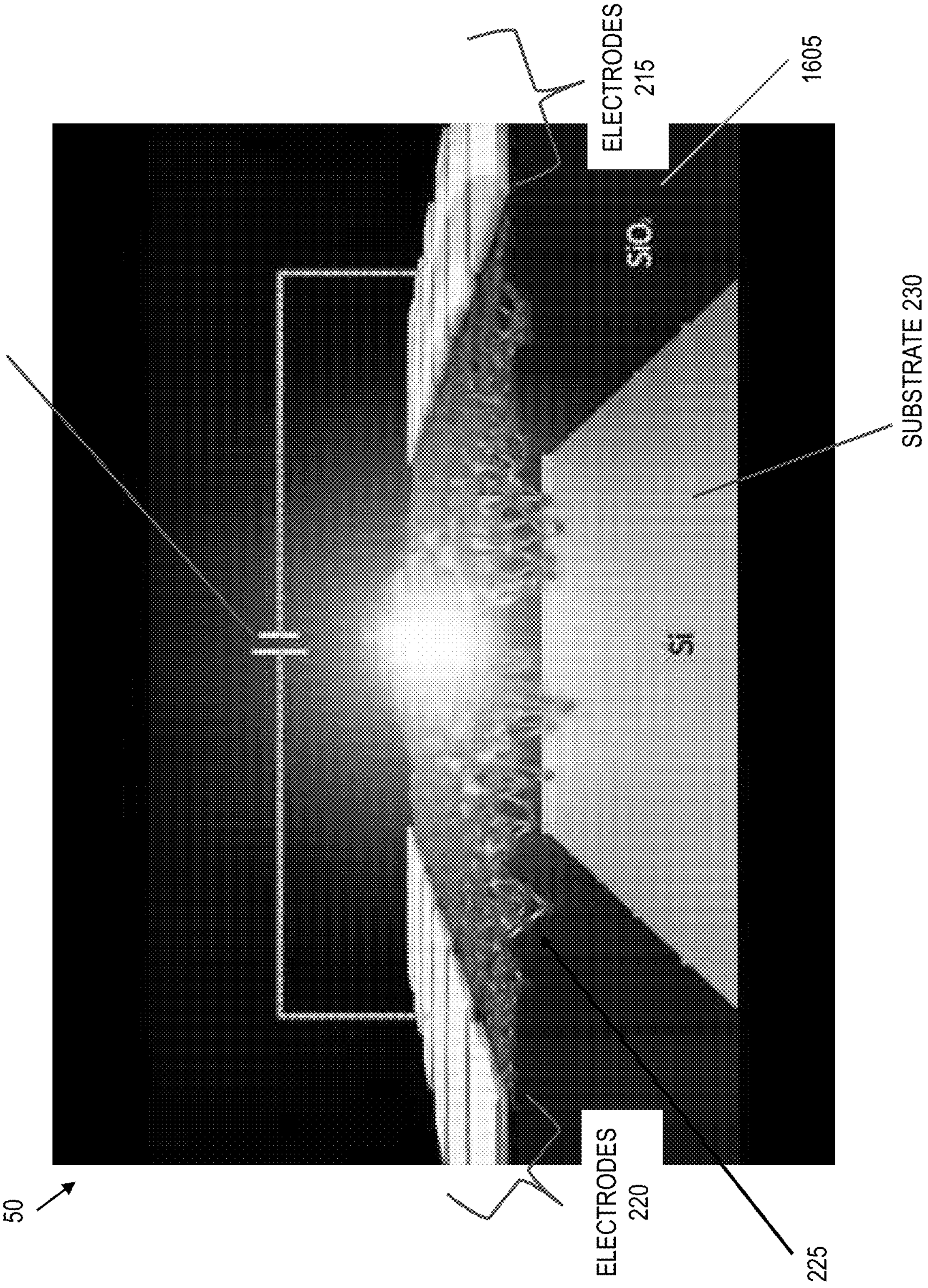
FIG. 16 illustrates an example light source which can be strips of graphene according to one or more embodiments.

FIG. 16 illustrates further details of an example light source 50 which can be strips of graphene 225 according to one or more embodiments. The one or more strips of graphene 225 are like an illuminating "light bulb". The light source 50 in FIG. 16 can be a chip, printed circuit, etc.

The graphene 225 can be placed in strips (a few microns in length, a few inches in length, etc.) across the inside of the helmet 100 on a substrate 230 (at 6.5 to 14 microns in length), and each strip of graphene 225 can span a trench of silicon like a bridge. Pillars 1605 can form the sides of the trench and the pillars 1605 support the electrodes 215 and 220. The pillars 1605 can be an oxide, such as silicon dioxide. The pillars 1605 could be silicon. Once the electrodes are attached to each side of the strips, then run 2-3, 4-10 volts across the electrodes 215 and 220 such that current flows through the strips of graphene 225 such that they light up. Longer/larger pieces of graphene 225 may require more voltage to light up, and for example, the longer pieces of graphene may require 4-10, 11-20 volts to light up. The graphene light bulb layer is placed between two layers of polycarbonate, within a predefined indentation/grove of the helmet (and then covered, etc. A protective covering can coated on the graphene light bulb layer, i.e., the light source 50.

As another example of the light source 50, the light source 50 can be a filament coated with a thin layer of graphene to power LED light bulb. In another example, the light source 50 can be a light emitting graphene transistor. In another example, the light source 50 can be a graphene light bulb on a chip that creates a photon circuit allowing the graphene light bulb to run on light.

Figure 17:
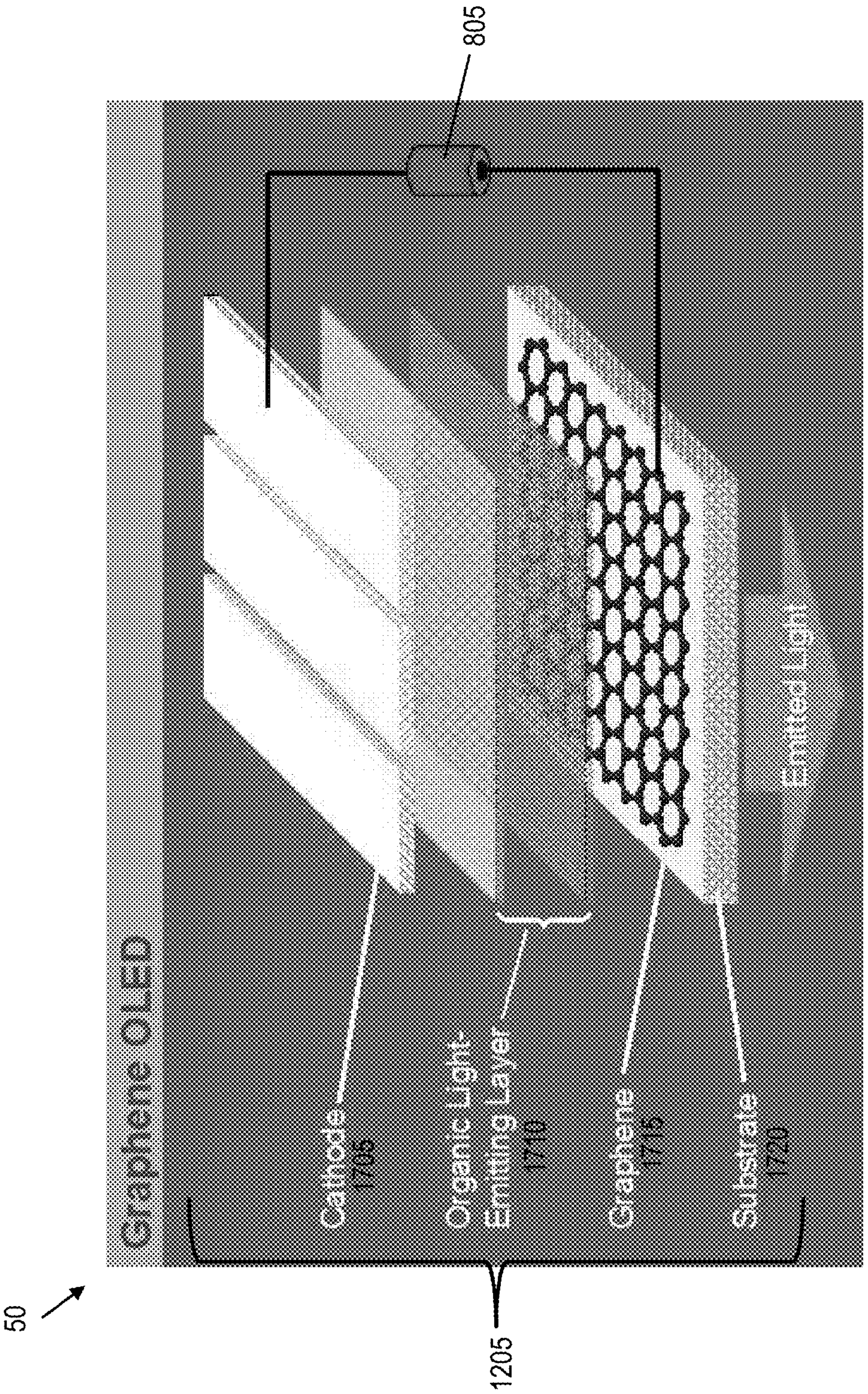
FIG. 17 depicts an example of a light source which is a graphene organic light emitting diode (OLED) that can be utilized according to one or more embodiments.

FIG. 17 depicts an example of a light source 50 which is a graphene organic light emitting diode (OLED) 1205 that can be utilized (e.g., in FIG. 12) according to one or more embodiments. In this example, a flexible OLED 1205 is shown, and the OLED is made flexible by modifying the graphene anode 1715 to have a high work function and low sheet resistance. Graphene is an almost completely transparent material and can optically transmit up to 97.7% of light. It is also highly conductive.

The cathode 1705 may or may not be transparent. The cathode 1705 injects electrons when a current flows through the OLED 1205. The cathode 1705 may include barium, calcium, etc. The OLED 1205 include an organic light emitting layer 1710, also referred to as the emissive layer. The organic light emitting layer 1710 can be made of organic plastic molecules (which are different from the conducting layer) that transport electrons from the cathode 1705, and this is where light is made. The organic light emitting layer 1710 may include polyfluorene.

In FIG. 17, the anode 1715 is graphene. The graphene anode 1715 is a transparent electrode with higher performance than other non-graphene electrodes, which means, more transparent, while at the same time, being more conductive. In other words, the OLED 1205 can be a graphene OLED where the anode and/or cathode has been replaced with graphene, thereby making the product transparent and flexible.

A substrate 1720 is attached to the graphene anode 1715. The substrate 1720 can be a clear plastic, glass, foil, etc., and the substrate 1720 supports the OLED. The substrate 1720 can be polyethylene terephthalate (PET), polycarbonate, etc.

Various details of the illuminating helmet 100 have been discussed above with reference to examples. It should be appreciated that the examples are not meant to be limiting. Although shown individually for explanation purposes, various aspects discussed herein can be combined. Also, various examples illustrate the use of graphene as the light source. However, it should be appreciated that the light source can be LEDs (arranged in the desired shape/pattern) and/or OLEDs.

Additionally, the illuminating helmet 100 can have a helmet shell (for example, outside layer 250) made of different protective materials other than polycarbonate. One illuminating helmet 100 can communicate to other devices through RFID, transmitters, receivers, etc., and this communication can control the illumination of the light sources 50, i.e., can turn on or off one or more of the light sources 50.

The helmet 100 can have different types of power sources 805 (lithium ion battery, graphene battery, etc.). The helmet 100 can have graphene touch sensors or a touch screen display with transparent conductors of a grid of wires with graphene on top of the grid creating a flexible touch screen.

The helmet 100 can be coated with graphene. The helmet 100 can have a graphene membrane. The illuminating helmet 100 can have a graphene visor that connects to helmet. Also, the helmet 100 can connect to different devices via the transmitter and receiver. The helmet 100 can include a microphone and/or speakers.

Figure 18:
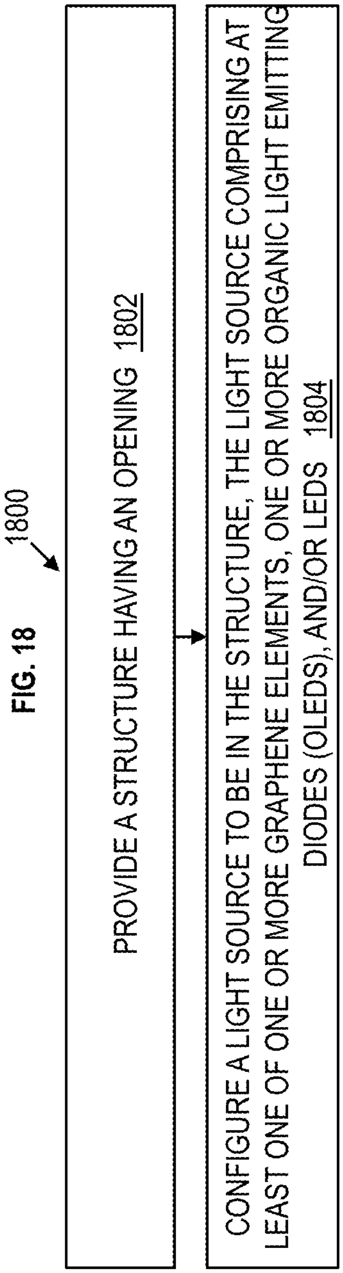

FIG. 18 depicts a method 1800 of providing a head apparatus 100 (for example, a helmet) for a user according to one or more embodiments. At block 1802, a structure (for example, an outside layer 250) having an opening (e.g., head opening) is provided. At block 1804, a light source 50 comprising one or more graphene elements 225 (strips/portions of graphene 225A-225N) and/or one or more LEDs/OLEDs 1205 is provided in the outside layer 250, such that the light source 50 is positioned to the structure.

The light source 50 is arranged on at least one or more portions of the structure. The light source 50 can be located in multiple places/locations around the illuminating helmet 100.

The light source 50 is positioned within at least one or more portions of the structure.

The structure comprises a shell (for example, outer layer 250) and the light source is embedded in the shell. For example, FIGS. 2 and 3A show the light source 50 embedded within the outside layer 250. The light source 50 does not protrude out a surface of the shell. For example, the light source 50 does not extend out of the curvature of the outside layer 250, so as not to be damage in a collision with another football helmet 100, the ground, a baseball, etc.

The light source 50 is configured to illuminate through a transparent portion or a semitransparent portion of the structure. The outside layer 250 can be transparent portion or a semitransparent portion.

The light source 50 is removable. The any strip/portion of graphene 225 can be replaced if damaged. Also, the graphene stickers 705 can be removed and replaced if damaged, and they can be replaced with a different shape.

The light source 50 is in a void (and/or compartment) of the structure such that a removable top layer covers (and protects) the light source 50. For example, FIG. 3A illustrates a removable portion of the outside layer. For any place that a light source 50 is in the helmet 100, a removable portion of the outside layer 250 can protect the light source 50 (whether graphene 225, LED/OLED 1205, and/or a combination of graphene 225 and LED/OLED 1205).

Illumination of the one or more graphene elements 225 are configured to be at least one or individually controlled and controlled as a group. The control system 1405 can control which graphene elements 225 (for example individual strips or cells) illuminate and which ones do not illuminate. The same occurs for the LEDs/OLEDs 1205.

A method of configuring a head apparatus for a user is provided. A structure (for example, outside layer 250) having an opening (for example, an opening for the user's head) is provided. A light source 50 comprising an organic light emitting diode (OLED) 1205 is provided, and the OLED 1205 is embedded in at least at least one or more portions of structure 250. FIGS. 2 and 3A shows examples of how the OLED 1205 can be embedded in the outside layer 250.

The structure comprises a shell (outside layer 250) such that the light source is embedded in the shell. The light source does not protrude out a surface of the shell. The light source is configured to illuminate through a transparent portion or a semitransparent portion of the structure. The light source 50 (for example, LEDs/OLEDs 1205) is in a void of the structure such that a removable top layer covers the light source. Although shown for graphene 225, FIG. 3A illustrates a removable portion of the outside layer 250 in which LEDs/OLEDs 1205 can be embedded.

Figure 15:
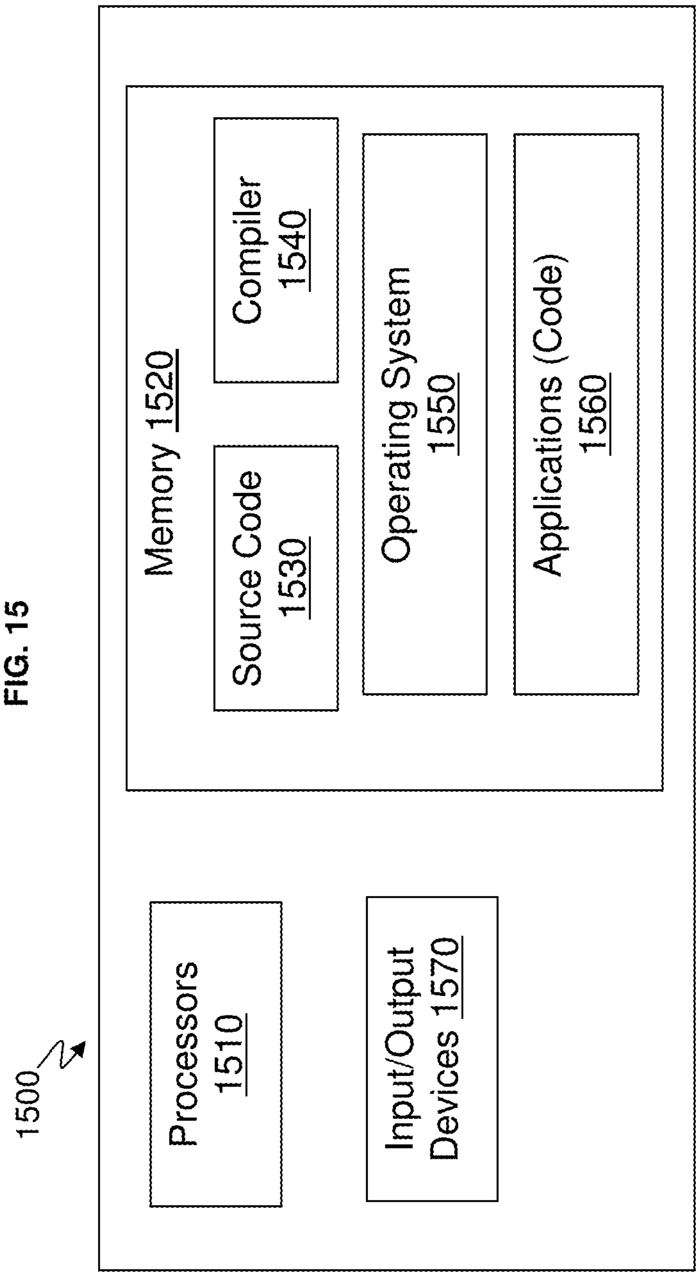
FIG. 15 is an example of a computer that includes features that may implemented in the helmet according to one or more embodiments.

Now turning to FIG. 15, an example illustrates a computer 1500 (e.g., any type of computer system including the control system 1405) that may implement features discussed herein. The computer 1500 may be a distributed computer system over more than one computer. Various methods, procedures, modules, flow diagrams, tools, applications, circuits, elements, and techniques discussed herein may also incorporate and/or utilize the capabilities of the computer 1500. Indeed, capabilities of the computer 1500 may be utilized to implement features of exemplary embodiments discussed herein.

Generally, in terms of hardware architecture, the computer 1500 may include one or more processors 1510, computer readable storage memory 1520, and one or more input and/or output (I/O) devices 1570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1510 is a hardware device for executing software that can be stored in the memory 1520. The processor 1510 can be virtually any custom made or commercially available processor, a central processing unit (CPU), a data signal processor (DSP), or an auxiliary processor among several processors associated with the computer 1500, and the processor 1510 may be a semiconductor based microprocessor (in the form of a microchip) or a macroprocessor.

The computer readable memory 1520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1520 may incorporate electronic, magnetic, optical, and/or other types of storage media. Note that the memory 1520 can have a distributed architecture, where various components are situated remote from one another, but can be accessed by the processor(s) 1510.

The software in the computer readable memory 1520 may include one or more separate programs, each of which comprises an ordered listing of executable instructions for implementing logical functions. The software in the memory 1520 includes a suitable operating system (O/S) 1550, compiler 1540, source code 1530, and one or more applications 1560 of the exemplary embodiments. As illustrated, the application 1560 comprises numerous functional components for implementing the features, processes, methods, functions, and operations of the exemplary embodiments.

The operating system 1550 may control the execution of other computer programs, and provides scheduling, input-output control, file and data management, memory management, and communication control and related services.

The application 1560 may be a source program, executable program (object code), script, or any other entity comprising a set of instructions to be performed. When a source program, then the program is usually translated via a compiler (such as the compiler 1540), assembler, interpreter, or the like, which may or may not be included within the memory 1520, so as to operate properly in connection with the O/S 1550. Furthermore, the application 1560 can be written as (a) an object oriented programming language, which has classes of data and methods, or (b) a procedure programming language, which has routines, subroutines, and/or functions.

The I/O devices 1570 may include input devices (or peripherals) such as, for example but not limited to, a mouse, keyboard, scanner, microphone, camera, etc. Furthermore, the I/O devices 1570 may also include output devices (or peripherals), for example but not limited to, a printer, display, etc. Finally, the I/O devices 1570 may further include devices that communicate both inputs and outputs, for instance but not limited to, a MC or modulator/demodulator (for accessing remote devices, other files, devices, systems, or a network), a radio frequency (RF) or other transceiver, a telephonic interface, a bridge, a router, etc. The I/O devices 1570 also include components for communicating over various networks, such as the Internet or an intranet. The I/O devices 1570 may be connected to and/or communicate with the processor 1510 utilizing Bluetooth connections and cables (via, e.g., Universal Serial Bus (USB) ports, serial ports, parallel ports, FireWire, HDMI (High-Definition Multimedia Interface), etc.).

In exemplary embodiments, where the application 1560 is implemented in hardware, the application 1560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include improved helmets. Technical benefits provide a novel structure and method for illuminating helmets.

It should be appreciated that the design for semiconductor devices may be included in or utilize features of an integrated circuit layout. An integrated circuit (IC) layout is also known as an IC layout, IC mask layout, or mask design. The integrated circuit layout is the representation of an integrated circuit in terms of planar geometric shapes which correspond to the patterns of metal, oxide, semiconductor layers, etc., that make up the components of the integrated circuit. Such an integrated circuit layout, including the layout of a semiconductor device, may be stored in a computer readable medium in preparation for fabrication as understood by one skilled in the art.

It will be noted that various microelectronic device fabrication methods may be utilized to fabricate the components/elements discussed herein as understood by one skilled in the art. In semiconductor device fabrication, the various processing steps fall into four general categories: deposition, removal, patterning, and modification of electrical properties.

Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others.

Removal is any process that removes material from the wafer: examples include etch processes (either wet or dry), and chemical-mechanical planarization (CMP), etc.

Patterning is the shaping or altering of deposited materials, and is generally referred to as lithography. For example, in conventional lithography, the wafer is coated with a chemical called a photoresist; then, a machine called a stepper focuses, aligns, and moves a mask, exposing select portions of the wafer below to short wavelength light; the exposed regions are washed away by a developer solution. After etching or other processing, the remaining photoresist is removed. Patterning also includes electron-beam lithography.

Modification of electrical properties may include doping, such as doping transistor sources and drains, generally by diffusion and/or by ion implantation. These doping processes are followed by furnace annealing or by rapid thermal annealing (RTA). Annealing serves to activate the implanted dopants.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for an athletic session comprising:

a football for the athletic session and comprising a transmitter and a receiver; and a head apparatus configured to communicate with the football during the athletic session, the head apparatus comprising:

a structure having an opening, the structure comprising an interior protection and an outside layer;

at least one light emitting diode coupled to a power source; and a control system configured to illuminate the at least one light emitting diode for exterior visibility during the athletic session, wherein the control system of the head apparatus is configured to receive a signal from the football to illuminate the at least one light emitting diode.

2. The system of claim 1, wherein the at least one light emitting diode is positioned within at least one or more portions of the structure.

3. The system of claim 1, wherein the at least one light emitting diode is embedded in the structure.

4. The system of claim 1, wherein a removable section of the outside layer of the structure covers the at least one light emitting diode.

5. The system of claim 4, wherein the removable section comprises a transparent portion or a semitransparent portion of the structure.

6. The system of claim 4, wherein the at least one light emitting diode is in a void of the structure such that the removable section covers the at least one light emitting diode.

7. The system of claim 1, wherein the control system receives a communication via satellite.

8. A method for an athletic session comprising:

receiving, by a helmet from a football of the athletic session, a signal, wherein the football comprises a transmitter and a receiver; and in response to receiving the signal from the football, controlling, by the helmet, illumination of at least one light source for exterior visibility during the athletic session, wherein the helmet comprises a structure having an opening and the at least one light source coupled to the structure.

9. The method of claim 8, wherein the at least one light source is positioned within at least one or more portions of the structure.

10. The method of claim 8, wherein the helmet further comprises a subscriber identity module confirmed to receive cellular service.

11. The method of claim 8, wherein:

the structure comprises an interior protection and an outside layer; and the outside layer comprises a transparent portion of the structure.

12. The method of claim 8, wherein the at least one light source is in a void of the structure such that a removable section covers the at least one light source.

13. The method of claim 8, wherein illumination of the at least one light source is configured to be individually controlled or controlled as a group.

* * * * *